US007609784B1

(12) United States Patent
Heistermann

(10) Patent No.: US 7,609,784 B1
(45) Date of Patent: *Oct. 27, 2009

(54) SIGNAL DECODING METHOD AND APPARATUS WITH DYNAMIC NOISE THRESHOLD

(75) Inventor: Fritz Heistermann, Hauppauge, NY (US)

(73) Assignee: DGI Creations, LLC, Raleigh, NC (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/811,891

(22) Filed: Jun. 12, 2007

Related U.S. Application Data

(63) Continuation-in-part of application No. 11/113,843, filed on Apr. 25, 2005, now Pat. No. 7,242,729.

(60) Provisional application No. 60/565,501, filed on Apr. 26, 2004.

(51) Int. Cl.
*H03H 7/30* (2006.01)
(52) U.S. Cl. .................. 375/329; 329/304; 329/306
(58) Field of Classification Search .......... 375/329; 329/304, 306
See application file for complete search history.

(56) References Cited

U.S. PATENT DOCUMENTS

| | | | | |
|---|---|---|---|---|
| 3,938,129 | A * | 2/1976 | Smither | 340/855.9 |
| 4,001,643 | A * | 1/1977 | Ramberg et al. | 361/8 |
| 4,379,284 | A | 4/1983 | Boykin | 340/310 |
| 4,400,688 | A | 8/1983 | Johnston et al. | 340/310 |
| 4,470,147 | A | 9/1984 | Goatcher | 375/77 |
| 4,516,079 | A | 5/1985 | York | 329/104 |
| 4,525,795 | A | 6/1985 | Rubin | 708/276 |

(Continued)

FOREIGN PATENT DOCUMENTS

EP 0 219 618 A1 4/1987

(Continued)

OTHER PUBLICATIONS

Sliskovic, "Robust digital receiver for frequency redundant digital communications over power lines", The 6th IEEE International Conference on Electronics, Circuits and Systems, 1999, Proceedings of ICECS '99, vol. 1, Sep. 5-8, 1999 pp. 457-460 vol. 1.*

(Continued)

*Primary Examiner*—Juan A Torres
(74) *Attorney, Agent, or Firm*—The Eclipse Group LLP; Kevin E. Flynn

(57) ABSTRACT

An apparatus and method for use by a receiver in decoding information sent by phase-shift keying over a carrier frequency for use with power line carrier (PLC) applications as it is adapted to appropriately position the sampling window based on a zero crossing of one of the phases of the power line. The method allows for receipt and processing of information on more than one carrier frequency and from transmitters operating on a phase of the power line that is different than the phase used by alternating current at the power grid frequency on the receiver to detect the zero crossings of the power line. Optionally, a threshold parameter may be dynamically adjusted in reaction to the underlying level of noise so as to reduce the number of bursts carrying actual data that are discarded as having only noise. A number of alternative embodiments are included.

7 Claims, 22 Drawing Sheets

U.S. PATENT DOCUMENTS

| | | | | |
|---|---|---|---|---|
| 4,563,650 | A | | 1/1986 | York et al. ..................... 329/50 |
| 4,583,090 | A | | 4/1986 | Eden et al. ............. 340/825.07 |
| 4,608,540 | A | | 8/1986 | Tsuchiya et al. ............ 329/306 |
| 4,709,339 | A | | 11/1987 | Fernandes ................... 364/492 |
| 4,709,377 | A | | 11/1987 | Martinez et al. ............ 375/265 |
| 4,914,418 | A | * | 4/1990 | Mak et al. ................... 370/201 |
| 5,195,098 | A | * | 3/1993 | Johnson et al. ............. 714/753 |
| 5,210,518 | A | * | 5/1993 | Graham et al. .............. 375/351 |
| 5,260,974 | A | * | 11/1993 | Johnson et al. ............. 375/317 |
| 5,289,476 | A | | 2/1994 | Johnson et al. ............. 714/775 |
| 5,317,598 | A | | 5/1994 | Cahalan et al. ................ 375/75 |
| 5,355,114 | A | * | 10/1994 | Sutterlin et al. ............. 375/347 |
| 5,548,837 | A | * | 8/1996 | Hess et al. ................ 455/278.1 |
| 5,553,081 | A | | 9/1996 | Downey et al. ................. 371/6 |
| 5,828,293 | A | * | 10/1998 | Rickard ....................... 375/257 |
| 5,832,041 | A | | 11/1998 | Hulyalkar ................... 375/340 |
| 5,844,949 | A | * | 12/1998 | Hershey et al. ............. 375/346 |
| 6,101,214 | A | | 8/2000 | Hershey et al. ............. 375/200 |
| 6,226,333 | B1 | | 5/2001 | Spalink ....................... 375/340 |
| 6,381,265 | B1 | | 4/2002 | Hessel et al. ................ 375/219 |
| 6,397,368 | B1 | | 5/2002 | Yonge et al. ................ 714/792 |
| 6,522,626 | B1 | | 2/2003 | Greenwood ................. 370/208 |
| 6,529,482 | B1 | * | 3/2003 | Lundby ....................... 370/252 |
| 6,564,636 | B2 | | 5/2003 | White ..................... 73/504.02 |
| 6,734,784 | B1 | | 5/2004 | Lester .................... 340/310.02 |
| 6,941,161 | B1 | * | 9/2005 | Bobisuthi et al. ......... 455/569.1 |
| 6,977,578 | B2 | | 12/2005 | Kline .................... 340/310.01 |
| 6,980,091 | B2 | | 12/2005 | White, II et al. ........ 340/310.01 |
| 7,145,438 | B2 | * | 12/2006 | Flen et al. .................... 714/776 |
| 7,519,134 | B1 | | 4/2009 | Heistermann et al. ....... 375/329 |
| 2004/0114692 | A1 | | 6/2004 | Matsumoto ................. 375/264 |
| 2004/0218696 | A1 | | 11/2004 | Suissa et al. ................ 375/334 |
| 2004/0246108 | A1 | | 12/2004 | Robertson et al. ...... 340/310.01 |
| 2005/0078648 | A1 | * | 4/2005 | Nilsson ...................... 370/342 |
| 2005/0083925 | A1 | | 4/2005 | Bonicatto et al. ........... 370/389 |

FOREIGN PATENT DOCUMENTS

| | | |
|---|---|---|
| EP | 1 062 731 B1 | 12/2000 |
| WO | WO 00/31934 | 6/2000 |
| WO | WO 01/03323 A1 | 1/2001 |
| WO | WO 01/41383 A2 | 6/2001 |

OTHER PUBLICATIONS

"Designing Systems with the IC/SS Power Line Carrier Chipset", National Semiconductor Application Note 919, National Semiconductor Corporation, 22 pgs., Jan. 1994.

Maxim Application Note 686, "QPSK Modulation Demystified" (Oct. 13, 2000), 7 pages, available at: www.maxim-ic.com/an686.

Kevin Wade Ackerman, "Timed Power Line Data Communication", 139 pgs., Jan. 2005. See in particular but not exclusively §§ 2.4 and 3.42.

\* cited by examiner

FIG. 6

Total Phase Shift (in degrees): 100  
Attenuation: 0.567  
arctan of (Q/I) in degrees: 101.085

| Angle in degrees | Sine | Cosine | Negative Sine | Negative Cosine | Sample Data | Data * Sine Sequence | Data * Cosine Sequence | Data * Negative (Sine) Sequence | Data * Negative (Cosine) Sequence |
|---|---|---|---|---|---|---|---|---|---|
| 0.00 | 0.000 | 1.000 | 0.000 | -1.000 | -0.098 | 0.000 | -0.098 | 0.000 | 0.098 |
| 10.00 | 0.174 | 0.985 | -0.174 | -0.985 | 0.000 | 0.000 | 0.000 | 0.000 | 0.000 |
| 20.00 | 0.342 | 0.940 | -0.342 | -0.940 | 0.098 | 0.034 | 0.093 | -0.034 | -0.093 |
| 30.00 | 0.500 | 0.866 | -0.500 | -0.866 | 0.194 | 0.097 | 0.168 | -0.097 | -0.168 |
| 40.00 | 0.643 | 0.766 | -0.643 | -0.766 | 0.284 | 0.182 | 0.217 | -0.182 | -0.217 |
| 50.00 | 0.766 | 0.643 | -0.766 | -0.643 | 0.364 | 0.279 | 0.234 | -0.279 | -0.234 |
| 60.00 | 0.866 | 0.500 | -0.866 | -0.500 | 0.434 | 0.376 | 0.217 | -0.376 | -0.217 |
| 70.00 | 0.940 | 0.342 | -0.940 | -0.342 | 0.491 | 0.461 | 0.168 | -0.461 | -0.168 |
| 80.00 | 0.985 | 0.174 | -0.985 | -0.174 | 0.533 | 0.525 | 0.093 | -0.525 | -0.093 |
| 90.00 | 1.000 | 0.000 | -1.000 | 0.000 | 0.558 | 0.558 | 0.000 | -0.558 | 0.000 |
| 100.00 | 0.985 | -0.174 | -0.985 | 0.174 | 0.567 | 0.558 | -0.098 | -0.558 | 0.098 |
| 110.00 | 0.940 | -0.342 | -0.940 | 0.342 | 0.558 | 0.525 | -0.191 | -0.525 | 0.191 |
| 120.00 | 0.866 | -0.500 | -0.866 | 0.500 | 0.533 | 0.461 | -0.266 | -0.461 | 0.266 |
| 130.00 | 0.766 | -0.643 | -0.766 | 0.643 | 0.491 | 0.376 | -0.316 | -0.376 | 0.316 |
| 140.00 | 0.643 | -0.766 | -0.643 | 0.766 | 0.434 | 0.279 | -0.333 | -0.279 | 0.333 |
| 150.00 | 0.500 | -0.866 | -0.500 | 0.866 | 0.364 | 0.182 | -0.316 | -0.182 | 0.316 |
| 160.00 | 0.342 | -0.940 | -0.342 | 0.940 | 0.284 | 0.097 | -0.266 | -0.097 | 0.266 |
| 170.00 | 0.174 | -0.985 | -0.174 | 0.985 | 0.194 | 0.034 | -0.191 | -0.034 | 0.191 |
| 180.00 | 0.000 | -1.000 | 0.000 | 1.000 | 0.098 | 0.000 | -0.098 | 0.000 | 0.098 |
| Accumulator Totals: | | | | | | 5.025 | -0.985 | -5.025 | 0.985 |
| | | | | | | Q COMPONENT | I COMPONENT | | |

FIG. 16 current threshold level) =10

Bursts 1-50

| Leading Significant bits | Decimal Value for threshold category level | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 | 3 2 | 3 3 | 3 4 | 3 5 | 3 6 | 3 7 | 3 8 | 3 9 | 4 0 | 4 1 | 4 2 | 4 3 | 4 4 | 4 5 | 4 6 | 4 7 | 4 8 | 4 9 | 5 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1111 | 15 | | | | | | | | | | | | | | | | | | | | | | | | | | | | | | | | | | | | | | | | | | | | | | | | | | | |
| 1110 | 14 | | | | | | | | | | | | | | | | | | | | | | | | | | | | | | | | | | | | | | | | | | | | | | | | | | |
| 1101 | 13 | | | | | | | | | | | | | | | | | | | | | | | | | | | | | | | | | | | | | | | | | | | | | | | | | | |
| 1100 | 12 | | | | | | | | | | | | | | | | | | | | | | | | | | | | | | | | | | | | | | | | | | | | | | | | | | |
| 1011 | 11 | | | | | | | | | | | | | | | | | | | | | | | | | | | | | | | | | | | | | | | | | | | | | | | | | | |
| 1010 | 10 | | | | | | | | | | | | | | | | | | | | | | | | | | | | | | | | | | | | | | | | | | | | | | | | | | |
| 1001 | 9 | x | x | x | | | | | | | | | | | | | | | | | | | | | | | | | | | | | | | | | | | | | | | | | | | | | | | |
| 1000 | 8 | | | | x | x | | | | | | | | | | | | | | | | | | | | | | | | | | | | | | | | | | | | | | | | | | | | | |
| 0111 | 7 | | | | | | x | x x x x | | | | | | | | | | | | | | | | | | | | | | | | | | | | | | | | | | | | | | | | | | |
| 0110 | 6 | | | | | | | | x x x x | | | | | | | | | | | | | | | | | | | | | | | | | | | | | | | | | | | | | | | | |
| 0101 | 5 | | | | | | | | | x x x | | | | | | | | | | | | | | | | | | | | | | | | | | | | | | | | | | | | | | | |
| 0100 | 4 | | | | | | | | | | | | x x | x x | x | x x | | | | | | | | | | | | | | | | | | | | | | | | | | | | | | | | | |
| 0011 | 3 | | | | | | | | | | | | | | | x | | x x | | | x | | x | | | | | | | | | | | | | | | | | | | | | | | | | | | |
| 0010 | 2 | | | | | | | | | | | | | | | | | | | | | | x x x | x x x x x x x x | | | | | | | | | | | | | | | | | | | | | | | | | |
| 0001 | 1 | | | | | | | | | | | | | | | | | | | | | | | | | | | | | | | | x x | | x x x | | | | | | | | | | | | | | | | |
| 0000 | 0 | | | | | | | | | | | | | | | | | | | | | | | | | | | | | | | | | | | | | | x x x | | | | | x x x | | | | | |

Peak value for batch of 50 bursts is 9 which is below 10

Page 1 of 2

Page 2 of 2

FIG. 20A

```
62levbatch
-- self adjusting threshold processor
-- one batch is 50 bursts, one block is 6 batches
-- the associated ram gets updated in processing bin F1
-- the first burst of a batch is written to the ram
-- the following bursts overwrite if they are greater
SUBDESIGN 62levbatch
( RAMO[3..0], D[3..0], F1, FIRST : INPUT;
  RAMI[3..0]                     : OUTPUT; )
-- VARIABLE
BEGIN
---- associated ram RAMO[3..0] holds the greatest level in a batch
   IF    F1 & FIRST         THEN RAMI[] = D[] ;
   ELSIF F1 & D[]>=RAMO[]   THEN RAMI[] = D[] ;
   ELSE                          RAMI[] = RAMO[] ;
   END IF ;
END ;
```

```
62levhold
-- self adjusting threshold processor
-- one batch is 50 bursts, one block is 6 batches
-- evaluates each block of 6 batches each
-- starting in center, counts up if batch is above threshold, counts down if
-- batch is below threshold, stays if batch equals threshold
SUBDESIGN 62levhold
( RAMO[3..0], D[3..0], THR[3..0], F2, FIRST : INPUT;
  RAMI[3..0]                                : OUTPUT; )
-- VARIABLE
BEGIN
---- associated ram RAMO[3..0] finds result over one block, i.e. six batches --
   IF    F2 & FIRST THEN        -- first batch
      IF    D[]<THR[]        THEN RAMI[] = 7 ;  -- count down from 8
      ELSIF D[]>THR[]        THEN RAMI[] = 9 ;  -- count up from 8
      ELSE                        RAMI[] = 8 ;  -- END IF ; -- stay
   ELSIF F2         THEN        -- batches 2 to 6
      IF    D[]<THR[] & RAMO[]>0  THEN RAMI[] = RAMO[]-1 ; -- count down
      ELSIF D[]>THR[] & RAMO[]<15 THEN RAMI[] = RAMO[]+1 ; -- count up
      ELSE                             RAMI[] = RAMO[] ; END IF ; -- stay
                                       RAMI[] = RAMO[] ; END IF ;
   ELSE
END ;
```

```
62levthr
-- self adjusting threshold processor
-- one batch is 50 bursts, one block is 6 batches
-- increases threshold if batch_up minus batch_down is greater than 3
-- decreases threshold if batch_down minus batch_up is greater than 2
-- stays for values in between, limits at 1 and 15
SUBDESIGN 62levthr
( RAMO[3..0], D[3..0], F3  : INPUT;
  RAMI[3..0]               : OUTPUT; )
-- VARIABLE
BEGIN
--- associated ram RAMO[3..0] holds effective threshold
   IF    F3 & D[]>=12 & RAMO[]<15 THEN RAMI[] = RAMO[]+1 ; -- up with at least 4 ups, stop at 15
   ELSIF F3 & D[]<=5  & RAMO[]>2  THEN RAMI[] = RAMO[]-1 ; -- down with at least 3 downs, stop at 1
   ELSIF F3 &           RAMO[]==0 THEN RAMI[] = RAMO[]+1 ; -- down with at least 3 downs, stop at 1
   ELSE                                RAMI[] = RAMO[] ; END IF ;

END ;

62valid
-- self adjusting threshold processor
SUBDESIGN 62valid
( L[3..0], THR[3..0], THM  : INPUT;
  VAL                      : OUTPUT; )

BEGIN
   IF !THM THEN  VAL = L[]>=THR[] ;
   ELSE          VAL = L[]>THR[] ; END IF ;
END ;
```

FIG. 20B

SIGNAL DECODING METHOD AND APPARATUS WITH DYNAMIC NOISE THRESHOLD

This application claims priority and incorporates by reference co-pending U.S. application Ser. No. 11/113,843 for Signal Decoding Method and Apparatus which in turn claimed priority to U.S. Provisional Application No. 60/565,501 for Signal Decoding Method. Both applications are incorporated by reference.

BACKGROUND

Field of Invention

This disclosure pertains to the field of signal processing. More specifically, the present disclosure pertains to a method of converting an analog signal used as a carrier for a digital bit stream for applications where the transmitter and the receiver can be synchronized. One such application is power line carrier (PLC) where data is carried on a carrier signal over a power line carrying alternating current. An aspect of this disclosure addresses dynamically adjusting a parameter used in the determination whether an incoming interval should be processed as having information signal content or discarded for having too high of risk of only having noise and not information to be decoded and used.

One of the problems with using a carrier frequency to convey information in analog form is that the transmitter and receiver may vary slightly in the way they create and perceive the information carrying carrier frequency. If there is a slight difference for example in the exact frequency generated by the transmitter from the expected frequency at the receiver, this difference complicates the precise discernment of phase angle shifts from one waveform to the next.

When more than one transmitter is connected to the same input of the receiver, it may be advantageous to allow Frequency Multiplexing to allow two or more transmitters each using a different carrier frequency to transmit data at the same time.

One of skill in the art will recognize the many advantages of implementing one or more of the teachings of the present disclosure in a signal decoder.

SUMMARY

The present disclosure is directed to an apparatus and method that satisfies needs previously unmet in the prior art solutions for decoding information sent by phase shift keying over a power line using a carrier signal. The apparatus can use a fixed threshold for distinguishing between bursts of analog signals carrying data or burst carrying just noise. Alternatively, the apparatus may use a dynamic threshold that varies over time to adjust to changes in network conditions such as changes in background noise levels in order to minimize the number of bursts carrying data that are discarded in error as deemed to be just noise.

BRIEF DESCRIPTION OF THE FIGURES

FIG. 6 conveys a set of sample data and reference values that can be used to discern the phase shift in the sample data using a set of accumulators or through use of the arctan of the quotient of Q/I.

FIG. 16 shows a data chart for a series of 50 bursts (a batch).

FIG. 20 shows examples of source code for the logic implemented by the schematic shown in FIG. 19.

DETAILED DESCRIPTION

The present disclosure will now be described more fully hereinafter with reference to the accompanying drawings, in which the concepts of the present disclosure are set forth in order to convey the relevant information to one of skill in the art.

Figure 1:
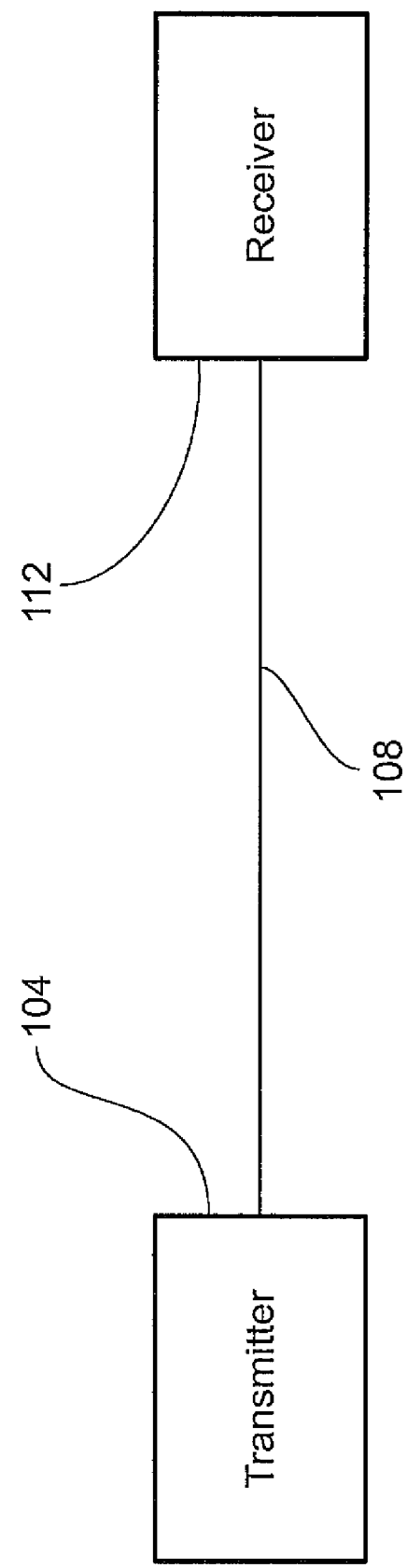
FIG. 1 introduces the prior art concepts of a transmitter, carrier media, and receiver.

A transmitter 104 conveying information across carrier 108 to receiver 112 is shown in FIG. 1. The prior art has developed many solutions to increase the quantity of information conveyed from a transmitter to a receiver. (Note that in many systems, an individual component acts as both a transmitter and a receiver. The use of these terms to simplify the discussion does not preclude the application of the teachings in this disclosure to components that act as both a transmitter and a receiver.)

One of the prior art solutions to increase the amount of information conveyed over a carrier is Phase Shift Keying (PSK). In PSK, the phase angle of a carrier signal is purposefully varied from burst to burst to convey binary information. The amount of information that can be sent is a function of the number of discrete phase angle shifts that are used. A system that has two possible shifts (0 degrees and 180 degrees) can convey one binary bit of information per measurement period. A system that recognizes four different phase angle shifts (0 degrees, +90 degrees, 180 degrees, and −90 degrees) can convey two bits of information per measurement period. A four phase angle system is often known as Quadrature Phase Shift Keying (QPSK). As the number of discernable phase shifts increases, so does the amount of information that can be conveyed per measurement period. For example, a system sufficiently sensitive to reliably discern eight different phase shift amounts would be able to send three bits per measurement period.

A second way to increase the amount of information carried by a carrier 108 between a transmitter 104 and a receiver 112 is to use multiple carrier frequencies to have multiple channels of communication over multiple frequencies (Frequency Division Multiplexing). Phase Shift Keying can be used on one or more of the various carrier signals on different frequencies to further increase the capacity of the carrier to convey information.

In order to provide a coherent example, the present disclosure will be described with respect to a current use of these teachings by DIGITALGRID, Inc. in a front end board (FEB) of a receiver that receives information from remote transmitters. The details provided are not limitations on the scope of the teachings beyond the limitations explicitly present in the claims deemed allowable by the patent examiners that approved them.

An input to the present method is a clock signal created for the Front End Board to allow it to operate synchronously with the transmitter. The creation of the input is described in connection with FIG. 3.

Creation of Clock Pulses for Use by the Front End Board

Figure 3:
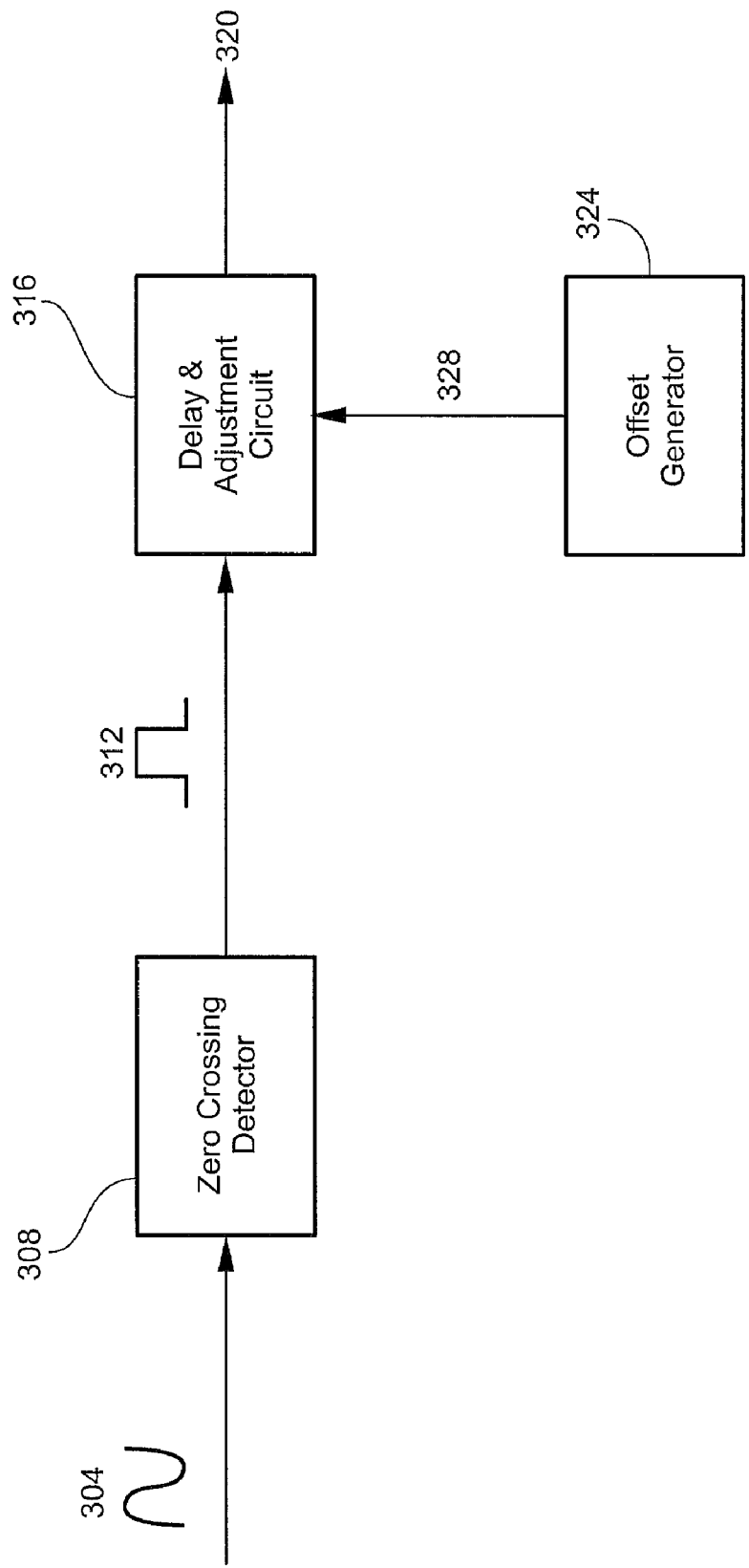
FIG. 3 provides details on the creation of clock pulses in accordance with one implementation of teachings of the present disclosure.

While the FEB is receiving the carrier signal, the zero crossing of the 60 Hz signal on the power line is detected. As shown in FIG. 3, the 60 Hz signal 304 is monitored by a zero crossing detector 308 which outputs a series of pulses 312. The series of pulses 312 are fed to a delay and adjustment circuit 316 that outputs a set of clock signals 320 with various offsets to the detected zero crossings. As there are two zero crossings per cycle, the frequency of the zero crossing is 120 Hz which is slightly less frequent than one zero crossing every 8.33 milliseconds. This is not to imply that the disclosure is limited to 60 Hz applications. Other frequencies can be used provided that the time interval between zero crossings is sufficiently long to allow a reasonable sample of the data carrying carrier frequency. For example, many countries use power systems that operate at various voltages but at a frequency of 50 Hz. The present disclosure could be extended to that frequency with the proportional timing adjustment for the increase in interval length between zero crossings.

An offset generator 324 can provide an offset input 328 to the delay and adjustment circuit. The offset generator 324 can be a digitally controlled pot or digitally controlled switch. The offset input can be used to provide the proper "gate" to the front end board so as to synchronize the transmitter and receiver so that the transmissions sent from the transmitter based on its local perception of the zero crossing of the power line signal match with the perception of zero line crossing at the receiver. For systems that are sending three sets of data from the transmitter to the receiver (as in the case when information about the three phases of a transformer are conveyed) it is useful to have offsets of zero, 60 and 120 degrees. These delays can be used to allow a decoder to compensate for the use of different phase legs by the transmitter and receiver in the transmission of information on the power line. Thus, a receiver that is using the B phase to provide the zero crossings for timing can be used to decode information conveyed on any of the three phases by using the offset of zero degrees for a B phase transmitter, and other offsets for the other phases. As implemented, one receiver channel could be receiving input from different transmitters operating on two or three different phases of the transformers and be able to process and decode the signals. The offset input can be used to compensate for the clockwise or counterclockwise generation.

A transmitter sends out a carrier signal over the power lines. As the carrier media 108 used in this particular application is a power line running upstream from a distribution transformer, carrier frequencies between 40 kHz and 70 kHz are well suited. Phase shift keying is used to convey information and in particular differentially modulated Quadrature Phase Shift Keying so that a change in phase from the last signal of: A) 0 degrees is a binary 00, B) 90 degrees is a binary 01, C) 180 degrees is a binary 10, and D) 270 degrees (negative 90 degrees) is a binary 11.

Figure 2:
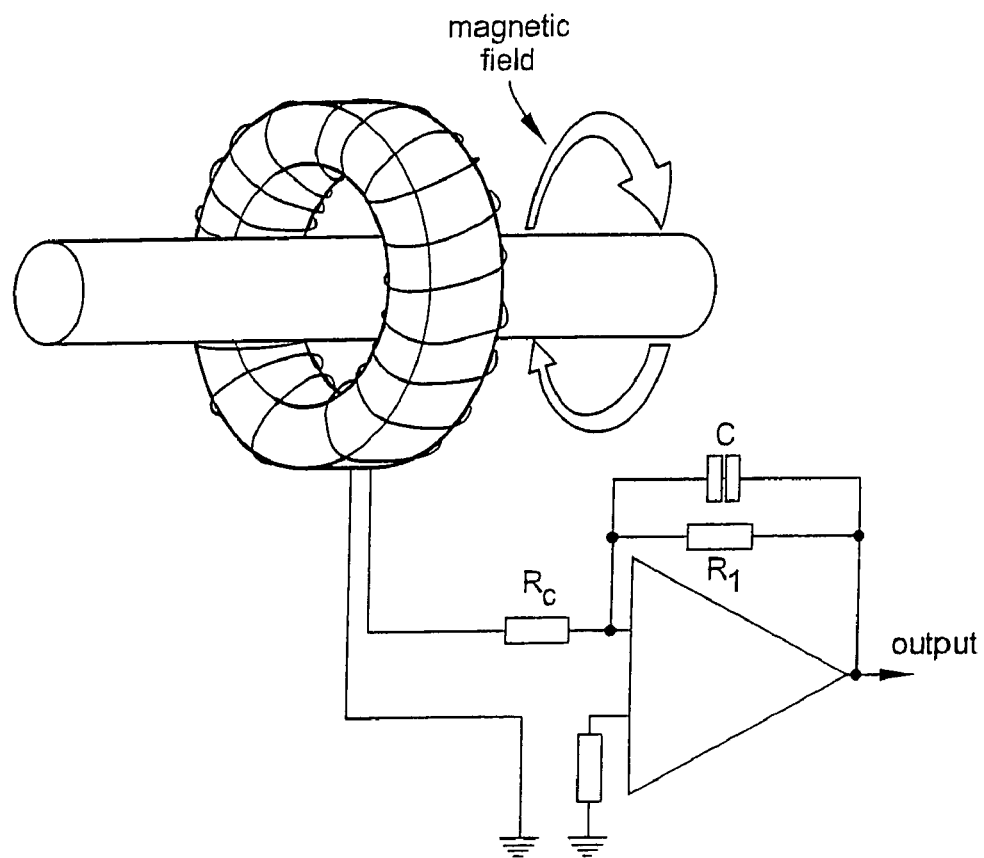
FIG. 2 illustrates a pick-up coil known in the prior art.

The carrier signal is decoupled from the power line by a Rogowski air coil as is known in the art. FIG. 2 provides an illustration of such a prior art coil and pickup circuitry 200.

The front end board (FEB) receives a carrier signal on an input port from the sensor coil. The FEB is adapted to receive input on any of the carrier frequencies used in the particular implementation. In this specific implementation, four carrier frequencies are used. As implemented, the FEB can receive and decode all four carrier frequencies at the same time.

After reception on the input port, the signal is amplified by a preamplifier.

After the preamplifier, the signal passes through an active band pass filter which provides some additional voltage gain. The range for the band pass filter will be a function of the range of carrier frequencies to be used. In one preferred embodiment, the band pass filter is set to pass signals between 42 kHz to 65 kHz.

After the active band pass filter, the signal passes through a post amplifier and conditions the signal for the Analog to Digital conversion (ADC). Conditioning the signal in one embodiment comprises centering the carrier signal to 2.5 volts DC as this is in the center of the range for the ADC unit. This gain could be set at the factory for the anticipated conditions or adjusted during installation or servicing in the field. However, once set this gain remains fixed until a technician adjusts the gain.

The ADC samples the analog voltage frequently. In this preferred embodiment the ADC samples the analog voltage every 2 microseconds.

The sampled analog voltage is converted to a 16 bit binary representation of the voltage.

The stream of 16 bit representations of the voltage ("digital image") pass to the decoder FPGA. In the preferred embodiment, the zero line crossings repeat approximately every 8.33 milliseconds and the transmitter sends out a carrier signal for approximately 8.3 milliseconds. For each 8.33 millisecond interval 6.4 milliseconds are sampled which translates to 3200 samples of 16 bit precision of the voltage of the carrier signal. As an implementation detail, the 6.4 millisecond sample starts approximately one millisecond after the zero crossing and ends approximately a millisecond before the next zero crossing as there is little coherent energy at or very near the zero crossing.

Figure 4:
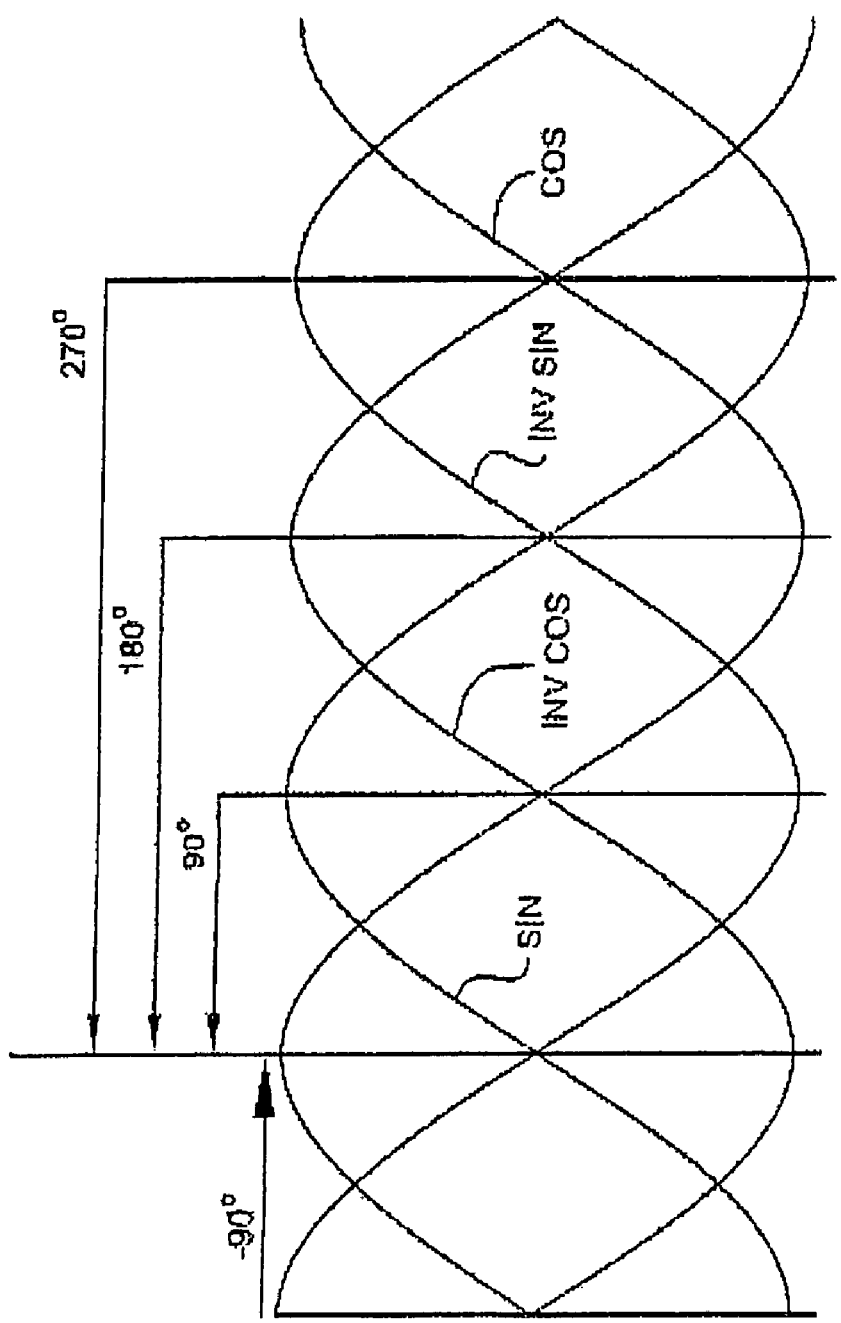
FIG. 4 provides an illustration of the relationship between sine, cosine, negative sine, and negative cosine as known in the prior art.

As an aside, FIG. 4 serves as a reminder that the addition of a phase shift of: A) zero degrees to a cosine wave is a cosine wave; B) 90 degrees to a cosine wave is a sine wave; C) 180 degrees to a cosine wave is the product of (cosine wave * −1) (a negative cosine wave); and D) 270 degrees (or negative 90 degrees) to a cosine wave is the product of (sine wave * −1) (a negative sine wave).

Figure 5:
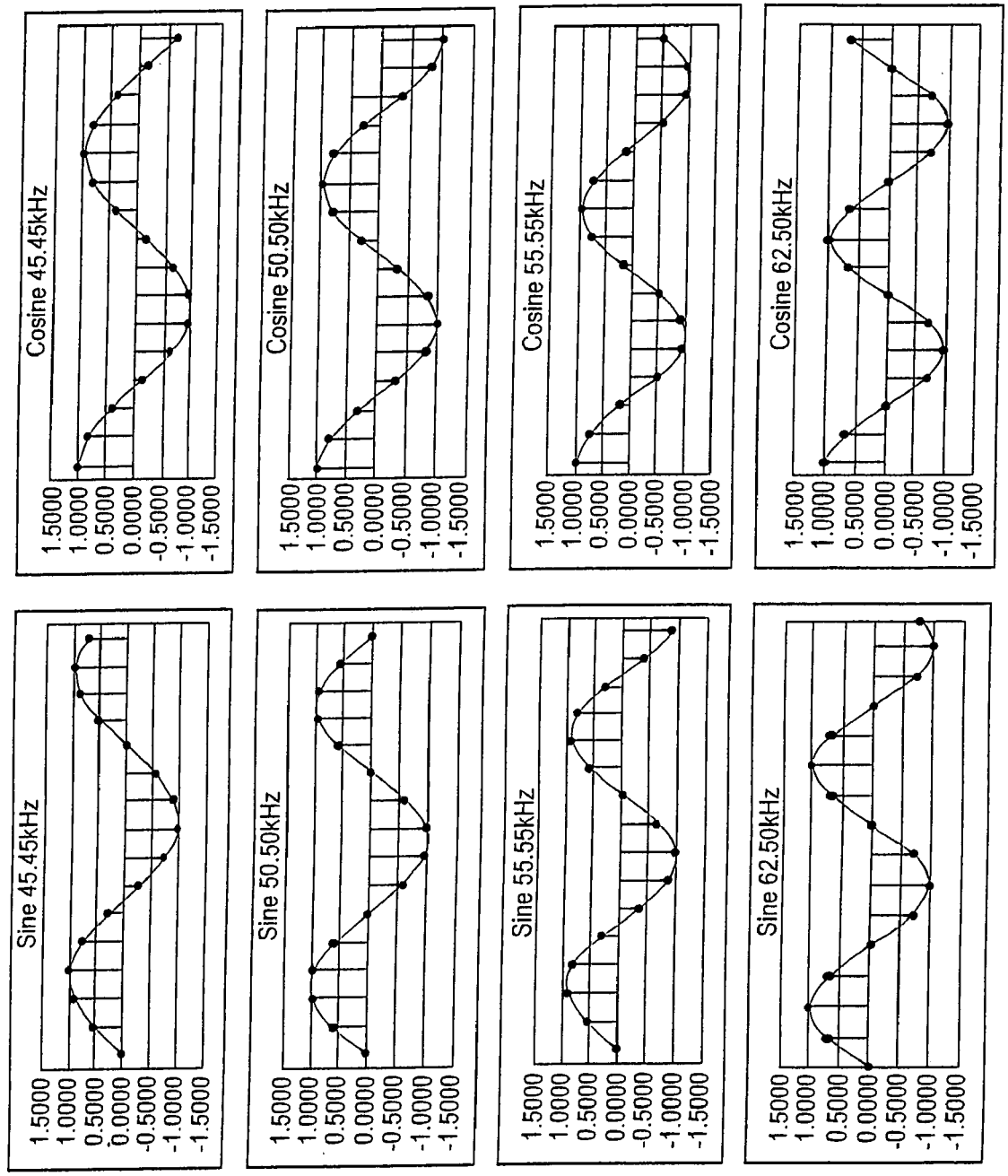
FIG. 5 illustrates the impact of frequency on the sampled pattern presented of sine and cosine waves during a fixed sampling period.

Based on a derivative of a local stable oscillator, a set of ideal values is created for the sine values for each of the four carrier frequencies. Thus, a sequence of numbers is generated to anticipate the values at 2 μsec intervals. A separate set of ideal values is created for the cosine values anticipated at the 2 μsec intervals for the four carrier frequencies. With the values for sine and cosine, the negative sine and negative cosine values are accessible. FIG. 5 illustrates the effect of frequency on the sine and cosine values expected during a fixed sampling period.

For each of the 3200 digital values gathered at 2 μsec intervals, the measured value is multiplied by the generated sine value for each of the four carrier frequencies for the corresponding time slot. These products are each added to an accumulator. The measured value is also multiplied by the generated cosine values for each of the four carrier frequencies and those products are added to other accumulators. In the preferred embodiment as operated in a 60 Hz environment, the set of measured values ("sampling window") is limited to 6.4 milliseconds of the 8.33 interval between zero crossings. Thus the first data value in the sampling window would be multiplied by the generated cosine value for a cosine wave created at particular carrier frequency and by the generated sine value for that particular carrier frequency. In one particular embodiment, the gross offset (of zero, 60, or 120 degrees) to account for phase leg differences is augmented by a fine offset in increments of a degree or less that can be used to shift the sampling window forward or back slightly with respect to the zero crossings of the power line voltage so as to improve the amount of energy received in the sample window as there is very little coherent energy near the zero crossing.

Note that the generated sine and cosine waves are not synchronized with the transmitter or with the detected zero crossing as the zero crossing. Thus the first burst of data will have a certain phase relationship with the local ideal waves. This will be random and unpredictable. It does not matter if the first burst has a random relationship with the local ideal waveforms as the information is conveyed by comparing the phase relationship of the second burst of data relative to the first burst of data and continuing to find the change in phase between successive bursts. Thus, the relationship between the initial burst of data and the local ideal sine and cosine waves for a given frequency is irrelevant as it effectively cancels out.

The purpose of the storage of accumulated products is to discern which of the 16 possible tuples is the best match (frequency, phase shift) for the incoming data stream. The effectiveness of this sort of accumulation is illustrated in FIG. 6.

To keep things simple, FIG. 6 focuses on discerning the phase shift for a single frequency. In order to provide an interesting range of numbers in a small table, the rows are based on 10 degree increments from zero to 180 degrees.

In a further attempt to introduce the concepts one layer at a time, FIG. 6 includes accumulators in accordance with an alternative embodiment of the present disclosure which would use sixteen accumulators rather than eight (as described below). Thus, for each of the four carrier frequencies, a set of generated values sine, cosine, inverted sine, and inverted cosine would be multiplied against the sampled data and accumulated. The best match would be the accumulator with the largest positive value (shown in FIG. 6 as the accumulated value for sine which is a 90 degree phase shift from cosine as this is the closest to the 100 degree phase shift imposed in the example illustrated by FIG. 6). If the largest positive value did not exceed a prescribed threshold the burst will not be recognized as valid.

The set of sample data used in FIG. 6 was created based on the following formula: (Cosine (input angle−(90 degrees phase shift+10 degrees offset))) multiplied by attenuation factor 0.567.

The set of manipulations purposefully distorted the cosine function shifted an intentional phase shift of 90 degrees as might be implemented by phase shift keying to show that this method works well even if the timing differences between components were to be off by 10 degrees. The attenuation factor was added to show that the results are not dependent on the measured values being approximately equal to the generated values.

As the sample data was based on the cosine shifted 100 degrees, it is not surprising that the data multiplied by the sine sequence provided the largest accumulation. Note that the difference is striking even after introducing noise from a phase offset of 10 degrees and attenuation. The next closest accumulation is less than a fifth of the total for the sine accumulation.

As the system is conveying binary information based on the difference in phase angle between successive transmissions (current phase angle minus previous phase angle), the value conveyed by the sine wave would be: A) 00 if the preceding signal was a sine wave, B) 01 if the preceding signal was a cosine wave C) 10 if the preceding signal was a negative sine wave and D) 11 if the preceding signal was a negative cosine wave.

Use of in Phase Component and Quadrature Component

A preferred embodiment does not have four accumulators per carrier frequency, but has only two. This two accumulator method is based on the knowledge that any sinusoidal can be expressed as the sum of a sine function and a cosine function. One accumulator for the products of the generated cosine wave values and the data stream. As noted in FIG. 6, this accumulator represents the In-Phase component (I) of the data stream with respect to the generated cosine wave data stream.

A second accumulator is used to store the products of the generated sine wave values and the data stream. As noted in FIG. 6, this accumulator stores the Quadrature Component (Q component). As is known in the art, the phase shift between a signal and a reference signal can be determined based on the arctan of (Q/I). As shown in FIG. 6, the arctan of the accumulators for Q and I based on the small samples used in the table yield a phase of 101.085 degrees off of a positive cosine wave. This result is very close to the 100 degrees expected as the sample data was created based on the use of an imposed phase shift of 90 degrees with an added phase shift of 10 degrees (90+10=100 degrees expected answer). It is important to stress that while the sample data did not have additional random noise that would tend to obscure the result, that this example was performed with only 19 pieces of sample data in contrast to the 3200 samples used in the preferred embodiment.

As an alternative to implementing the arctangent function, a preferred embodiment of the present disclosure scales the Q and I accumulations by shifting them both so that the larger of the two absolute values is shifted to make the most significant bit a 1. Thus, for a positive values if using 15 bits are used for the magnitude and the leading bit used to convey sign, a pair of magnitudes of 000 0011 0101 1100 and 000 0001 1101 0010 both get shifted five places to the left to become 110 1011 1000 0000 and 011 1010 0100 0000. The two shifted values are compared to a lookup table that maps the various pair values to phase shift values through the use of an arctangent of (Q/I). The shift level would be 5.

When representing positive numbers, the most significant bit is the sign bit and is set to zero. Thus, the magnitude number can be shifted until the second most significant bit does not equal the most significant bit 01 would be zero for positive sign followed by a 1 in the most significant magnitude bit.

When representing negative numbers using two's compliment convention, the most significant bit is set to 1 to indicate a negative sign and the binary digits are set to complimented values so that a 0 is a bit and a 1 is not. Thus, a negative number would be shifted until the two most significant bits are not the same; in this case a 10 with 1 for negative sign and 0 for a bit now in the most significant bit of the magnitude component of the number. In both cases, the magnitude is shifted until the most significant bit in the magnitude does not equal the sign bit.

As the example uses a differential QPSK, the previous phase angle is subtracted from the current phase angle to discern the phase difference. This difference is normalized. Thus, if the phase difference is determined to be between −45 and +45 degrees, then the conveyed bits are translated as a binary 00. If the phase difference is determined to be between +45 degrees and +135 degrees then the conveyed bits are translated as binary 01. If the phase difference is determined to be between +135 degrees and +225 degrees then the conveyed bits are translated as binary 10. If the phase difference is determined to be between +225 degrees and +315 degrees then the conveyed bits are translated as binary 11.

In order to avoid treating noise as a valid burst, an acceptance threshold can be set for the absolute value of the accumulator so that absolute values of the accumulator values equal or below a set threshold cause this measurement to be treated as not valid. If either the I or Q accumulator has an absolute value above the threshold, then the burst is treated as valid. A method for dynamically adjusting the threshold value to react to changes in system conditions is discussed below. (One of skill in the art could opt to implement this concept by accepting values equal to or above a threshold rather than rejecting values equal to or below a threshold.)

Hardware Implementation

Figure 7:
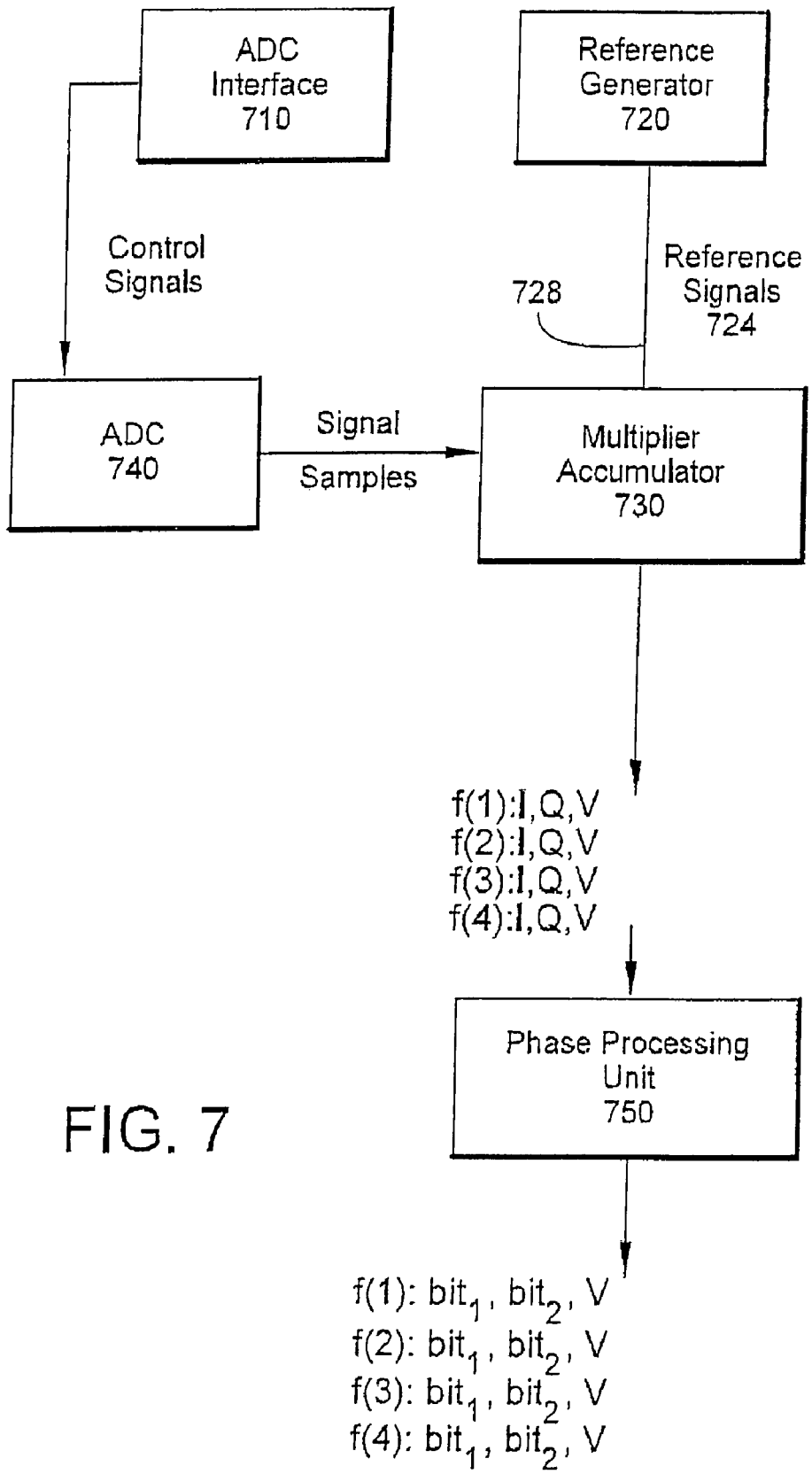
FIG. 7 provides an illustration of the logical modules for one embodiment implementing teachings from the present disclosure.

The teachings of the present disclosure could be in a Field Programmable Gate Array (FPGA) such as an ALTERA™ EP1K50TC144-2. The logical modules of the preferred embodiment are represented in FIG. 7. In this embodiment, the functions beyond the ADC are performed within the FPGA although the teachings could be implemented with other allocations of functions.

The ADC interface 710 generates the signals required for the operation of the ADC. The ADC interface provides the information on when to start acquiring the 6.4 milliseconds of data shortly after the zero crossing. The ADC interface also provides the clock signal for the ADC. The clock signals can be provided by a divide down using a standard off-the-shelf TV crystal and the addition of the 0 degree, 60 degree or 120 degree delays relative to the detected zero crossing.

The Reference Generator 720 generates the reference signals 724. As described above, these are sampled sine and cosine signals represented by binary values. The Cosine signal is used as the reference for the I channel and the Sine signal is used as the reference for the Q channel of the Multiplier Accumulator. For a system with four channels (frequencies) there are a total of eight sequences. The eight sequences are multiplexed onto a common bus 728 in order to facilitate time multiplexing of the processing functions.

The Multiplier Accumulator 730 (MAC) multiplies the signal samples from the ADC 740 with the corresponding I and Q reference samples generated by the reference generator. The resulting I and Q products are accumulated in the I and Q accumulators over the accumulation interval. The MAC functions are time-shared eight ways by the I and Q channels for each of the four transmitter frequencies. The MAC also compares the accumulator outputs with a set minimum threshold for the absolute value of the accumulator to determine if a burst is to be declared a valid burst.

The Phase Processing Unit 750 (PPU) receives the I and Q accumulation results from the MAC for each of the transmitter frequencies. The I and Q magnitudes from the accumulation results are scaled by shifting up the bits until the Most Significant Bit (MSB), the sign bit, is unequal to the next lower bit. The MSB is used to convey the sign of the accumulated result with the MSB conveying a zero when the accumulation result is positive and a one when the result is negative (two's complement representation convention).

The scaled values of the I-Q register pair represent the orthogonal components of a vector. These components provide sufficient information to determine the value of the angle of the vector which is the phase angle needed in order to obtain the conveyed digital bits.

The I and Q components are used in a three stage phase lookup table to obtain the phase of the received burst relative to the generated sine wave.

Figure 8:
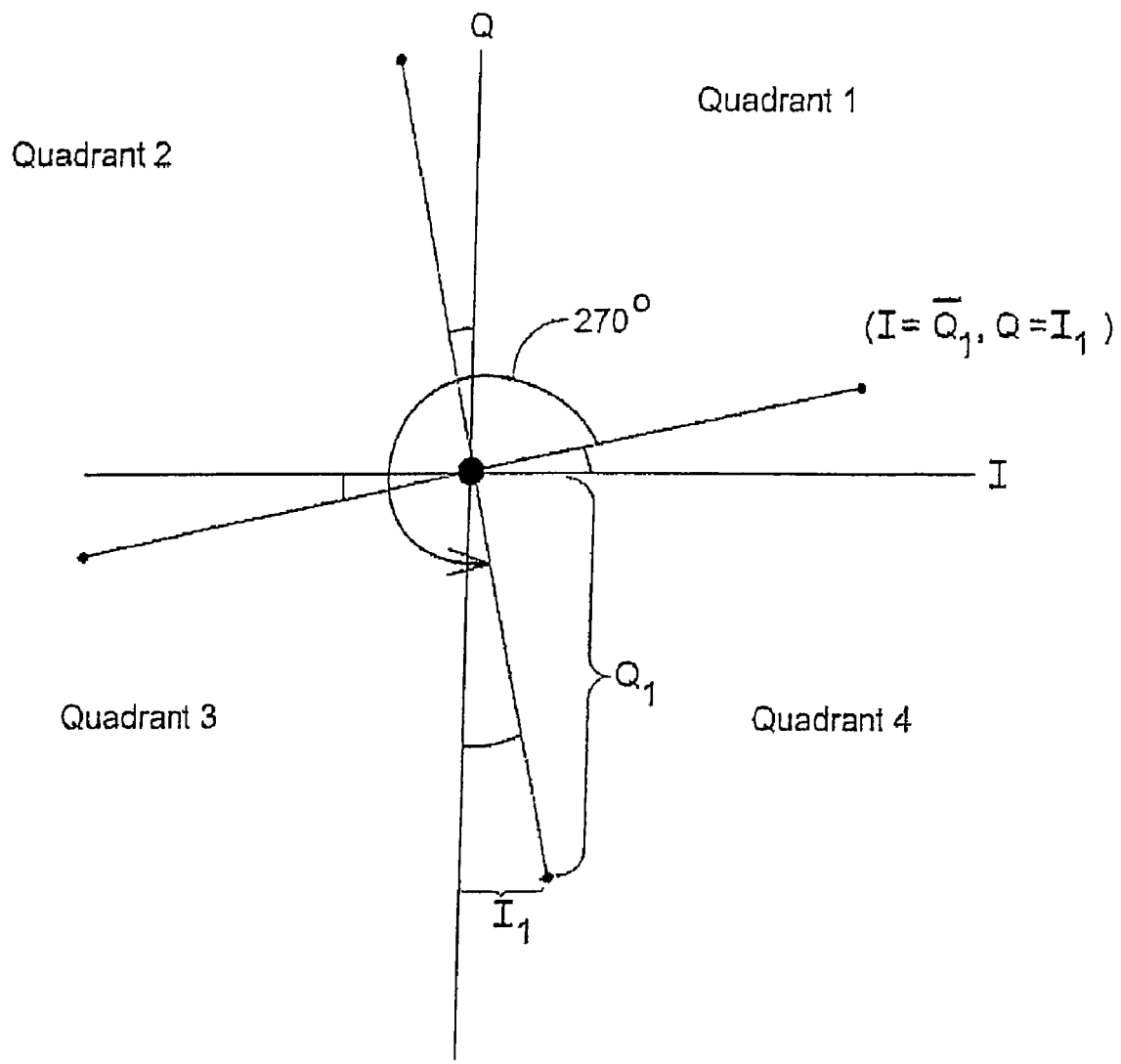
FIG. 8 illustrates the transforms from quadrants 2, 3, and 4 to quadrant 1 and the transform of the result of the arctan of the quotient of Q/I back to the original angle.
Figure 9:
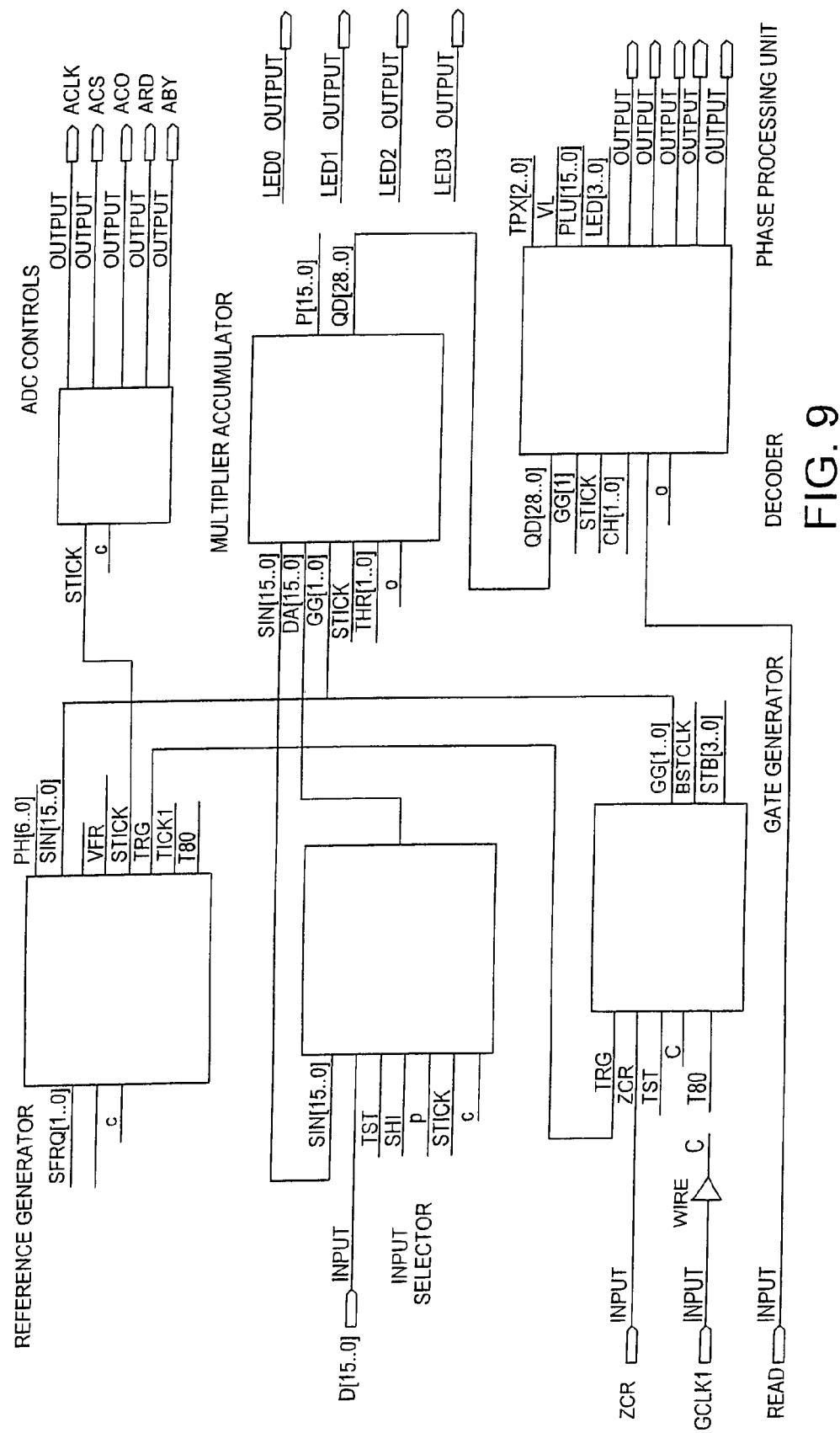
FIG. 9 provides a top level representation of one particular implementation of the present disclosure on a Field Programmable Gate Array (FPGA).
Figure 10:
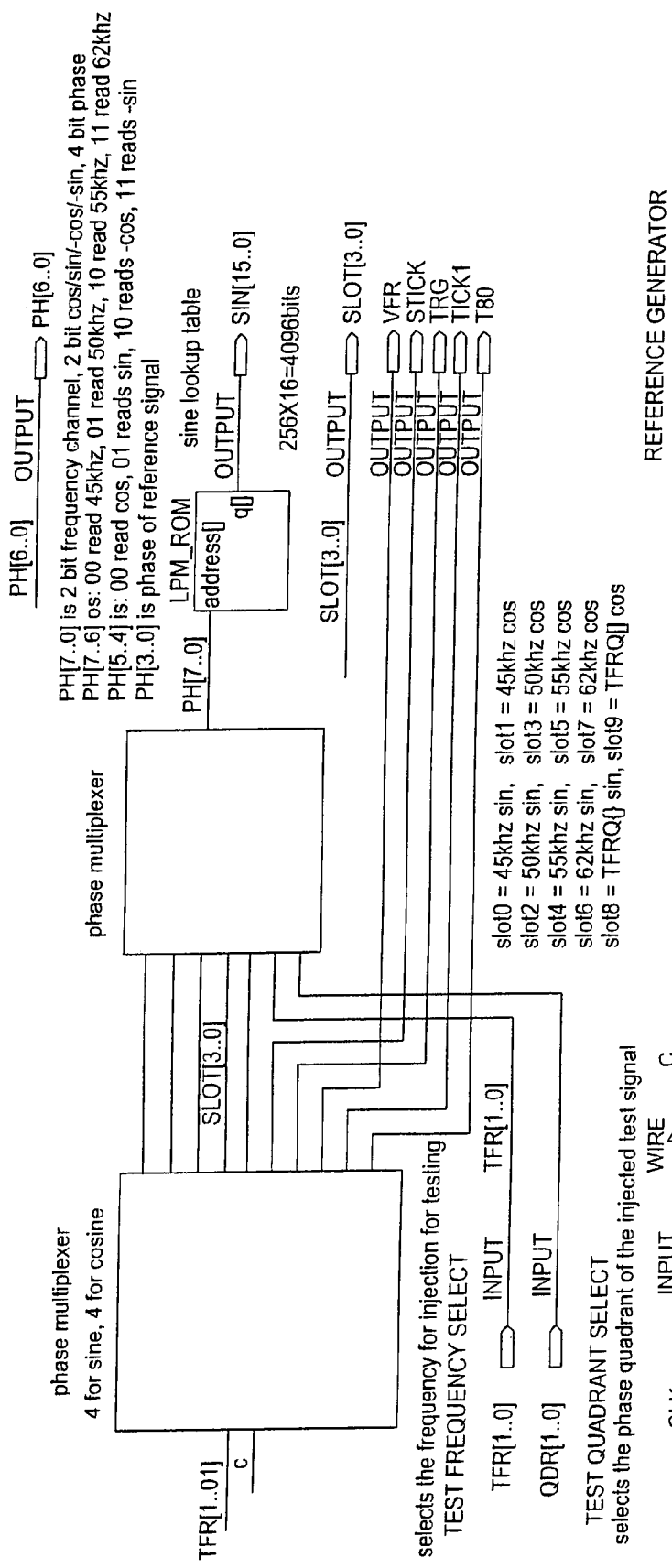
FIG. 10 provides details regarding one particular implementation of the reference generator used in the present disclosure.
Figure 11:
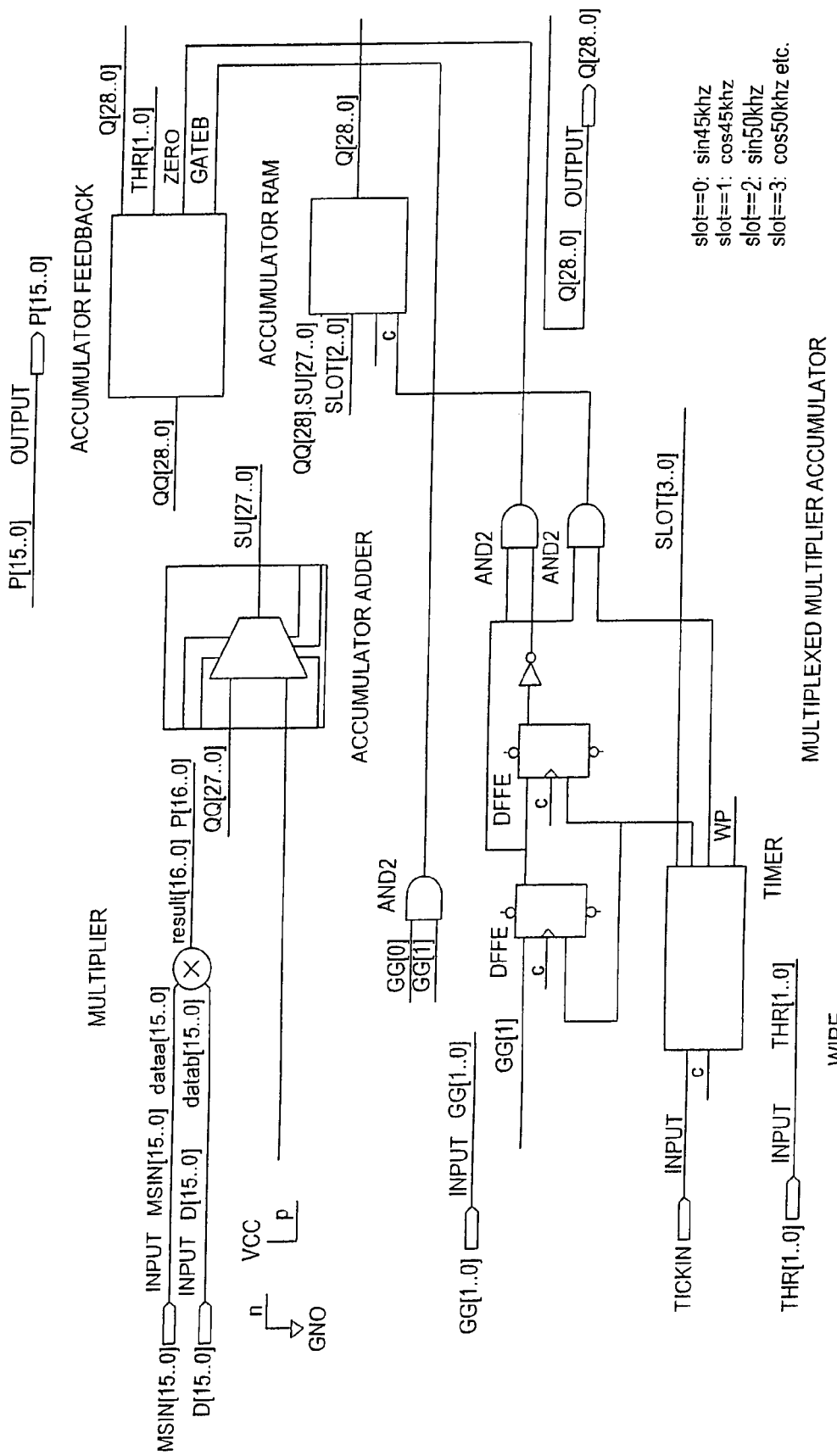
FIG. 11 provides details regarding one particular implementation of the multiplexed multiplier accumulator used in the present disclosure.
Figure 12:
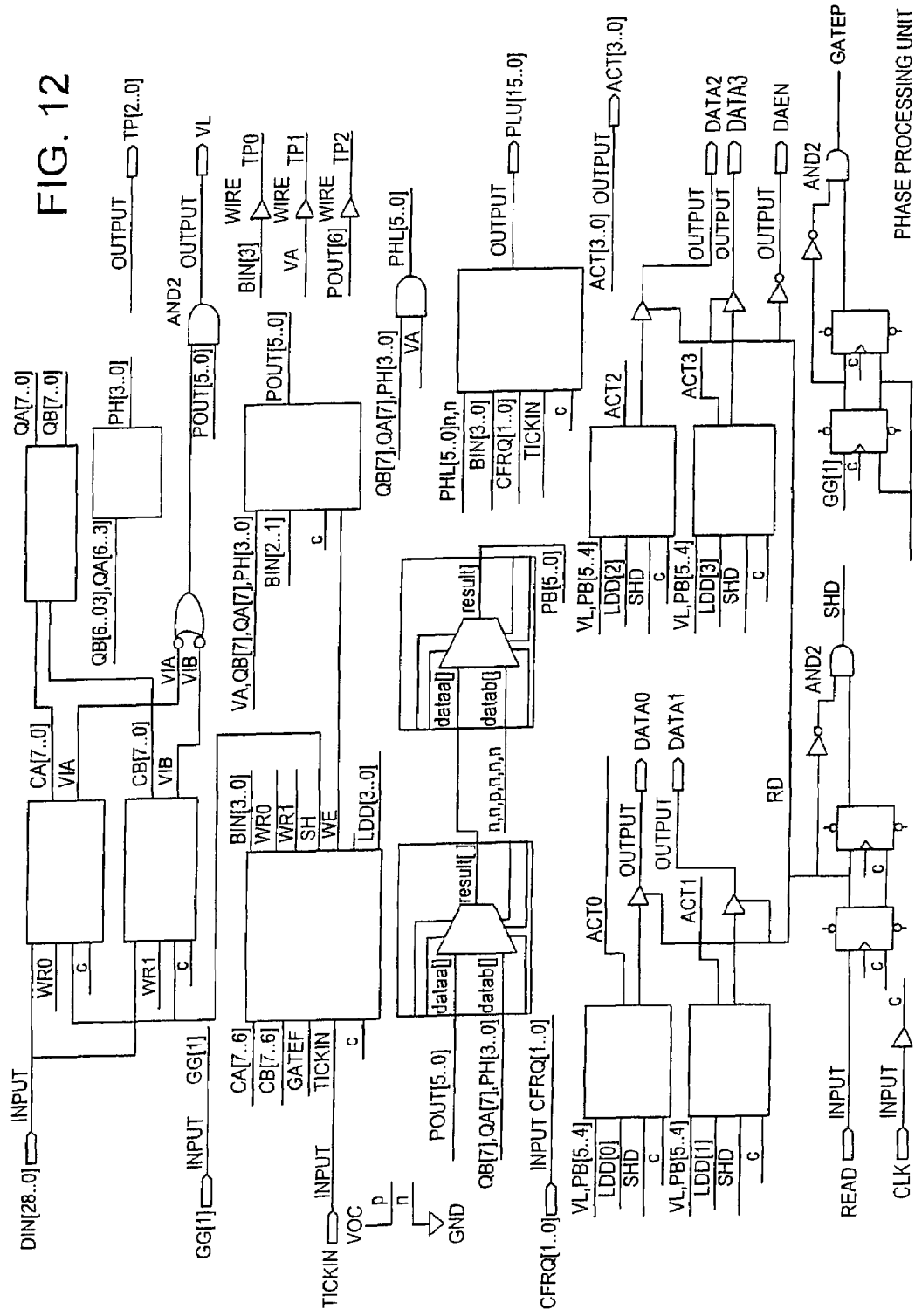
FIG. 12 provides details regarding one particular implementation of the phase processing unit used in the present disclosure.

In the first stage the sign bits (highest order bits also called the most significant bits) are checked to determine whether the magnitude bits (the bits other than the most significant bit) are complemented/not complemented and swapped/not swapped. Complemented as used in this application refers to the binary manipulation known as 2's complement. One or both of the I and Q values can be complemented as part of the transformation from quadrants 2, 3, or 4 to quadrant 1. Swapping is the exchange of the I and Q values. The possible combinations of complemented/not complemented and swapped/not swapped effectively rotate the I-Q vector into the first of four quadrants. By performing this rotation, the size of the table needed to translate the I-Q vector to a phase angle is reduced by 75%. By convention, the quadrants are numbered in counterclockwise order with quadrant 1 having both I and Q positive. The x axis is used for 1 and the y axis is used for Q. This is illustrated in FIG. 8 which has four vectors, each rotated approximately 10 degrees off the quadrant reference line. The treatments needed to cause rotation to quadrant 1 are summarized in Table A.

TABLE A

| Original Quadrant | I term | Q term | Treatment to rotate to Quadrant 1 | | After Transformation |
|---|---|---|---|---|---|
| | | | Complement? | Swap I and Q? | original I, Q becomes: |
| 1 | Positive | Positive | Neither | No | I, Q |
| 2 | Negative | Positive | I | Yes | Q, −I |
| 3 | Negative | Negative | Q and I | No | −I, −Q |
| 4 | Positive | Negative | Q | Yes | Q, I |

As an example of the transforms, the angle in quadrant four shown in FIG. 8 can be translated into quadrant 1 by taking the initially negative value of Q and performing a two's complement operation to obtain the inverse of the value. If the complement for the original value of Q is swapped with the original value of I, the result is two positive components for the vector which places it in quadrant 1.

After the phase angle has been translated into quadrant 1, the second stage performs the actual arc tangent lookup for the pair of I, Q values against a table for a range from zero to 90 degrees. While this step could be done with a single value of Q/I, dividers are cumbersome to implement so it is more convenient to pass a pair of values to the look-up table rather than divide. Those of skill in the art could choose to implement the present disclosure using a divider and passing a single value to an appropriately modified look-up table.

The third stage combines the original sign bits with the 90 degree phase bits to reconstitute the phase representation over the full range of zero to 360 degrees. The various treatments are summarized in Table B.

TABLE B

| Original Quadrant | Original I term | Original Q term | Treatment to Convert the Quadrant 1 arctan result to correct final result. |
|---|---|---|---|
| 1 | Positive | Positive | None (add 0 degrees) |
| 2 | Negative | Positive | Add 90 degrees in order to make this conversion |
| 3 | Negative | Negative | Add 180 degrees in order to make this conversion |
| 4 | Positive | Negative | Add 270 degrees in order to make this conversion |

The current phase value is stored for use with decoding the next burst. To continue with the example of the quadrant 4 vector, the arctan of the Q/I pair after the transform to place the angle into quadrant 1 would be 10 degrees. The addition of 270 degrees of counterclockwise rotation to 10 degrees accurately converts the intermediate value to the correct value.

The present code value that conveys the binary bits in this particular modulation scheme is the current phase angle minus the previous phase angle as this is the convention used by the encoders used at the transmitter end. The encoding and decoding process could of course be implemented so that binary bits are conveyed based on the difference between the previous phase angle minus the current phase angle. The present disclosure could be modified slightly to accommodate that convention. The conversion of phase angle difference to binary is as follows: A) zero degrees plus or minus 45 degrees is decoded as binary 00; B) ninety degrees plus or minus 45 degrees is decoded as binary 01; C) 180 degrees plus or minus 45 degrees is decoded as binary 10; and D) 270 degrees plus or minus 45 degrees is decoded as binary 11.

The two bit binary output decoded from the burst phase shift and the validity bit generated by the MAC based on exceeding the required minimum absolute value for the accumulator are loaded into a three bit shift register. The three bit shift register can be shifted and read by the system processor.

This completes the decoding of one channel in the PPU. The same process is repeated sequentially for the other channels.

Flowchart of Implementation Using I and Q

Figure 13:
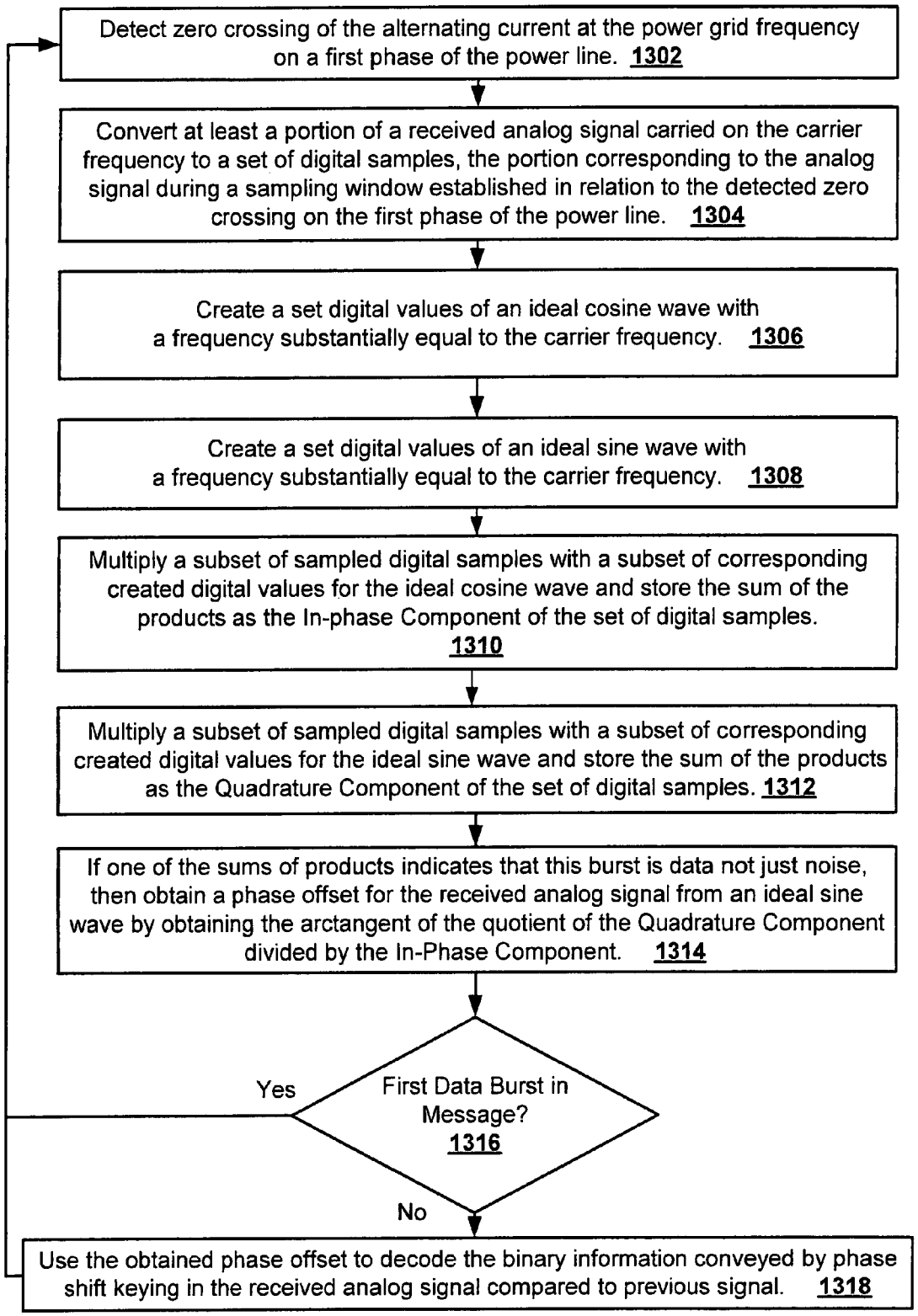
FIG. 13 is a flowchart of an example of a method for decoding a phase shift keying signal carried on a carrier frequency over a power line operating at a power grid frequency.

FIG. 13 is a flowchart of an example of a method for decoding a phase shift keying signal carried on a carrier frequency over a power line operating at a power grid frequency.

At step 1302, a carrier signal being transmitted on a first phase of the power line is received and a zero crossing of the first phase of the power line signal is detected.

At step 1304, at least a portion of the received carrier signal is converted to digital samples. The portion of the signal corresponds to the carrier signal sampled during a window of time that is based on the detected zero crossing.

At step 1306, generate a set of digital values that form an ideal cosine wave with a frequency substantially equal to the carrier frequency.

At step 1308, generate a set of digital values that form an ideal sine wave with a frequency substantially the same as the carrier frequency.

At step 1310, the digital samples are multiplied by corresponding generated digital values representing the ideal cosine wave. The products are summed and the sum is stored as an in-phase component of the set of digital samples.

At step 1312, the digital samples are multiplied by corresponding generated digital values representing the ideal sine wave. The products are summed and the sum is stored as the quadrature component of the set of digital samples.

At step 1314, when the maximum value in one of the two accumulators exceeds a threshold treat the burst as having data. The arctangent function of the quotient of the quadrature component value divided by the in-phase component value is calculated to arrive at a phase offset for the received analog signal relative to the ideal cosine wave.

At branch 1316, go back to step 1302 if this is the first data burst in a message as it is the relative phase angles from burst to burst that conveys data. If this is not the first data burst in a message then proceed to 1318.

At step 1318, the phase offset is then used to decode the binary information from the phase shift keying in the received analog signal input by determining the phase shift between this burst of data and the previous burst of data.

Flowchart for X Accumulators for X Possible Phase Shifts

Figure 14:
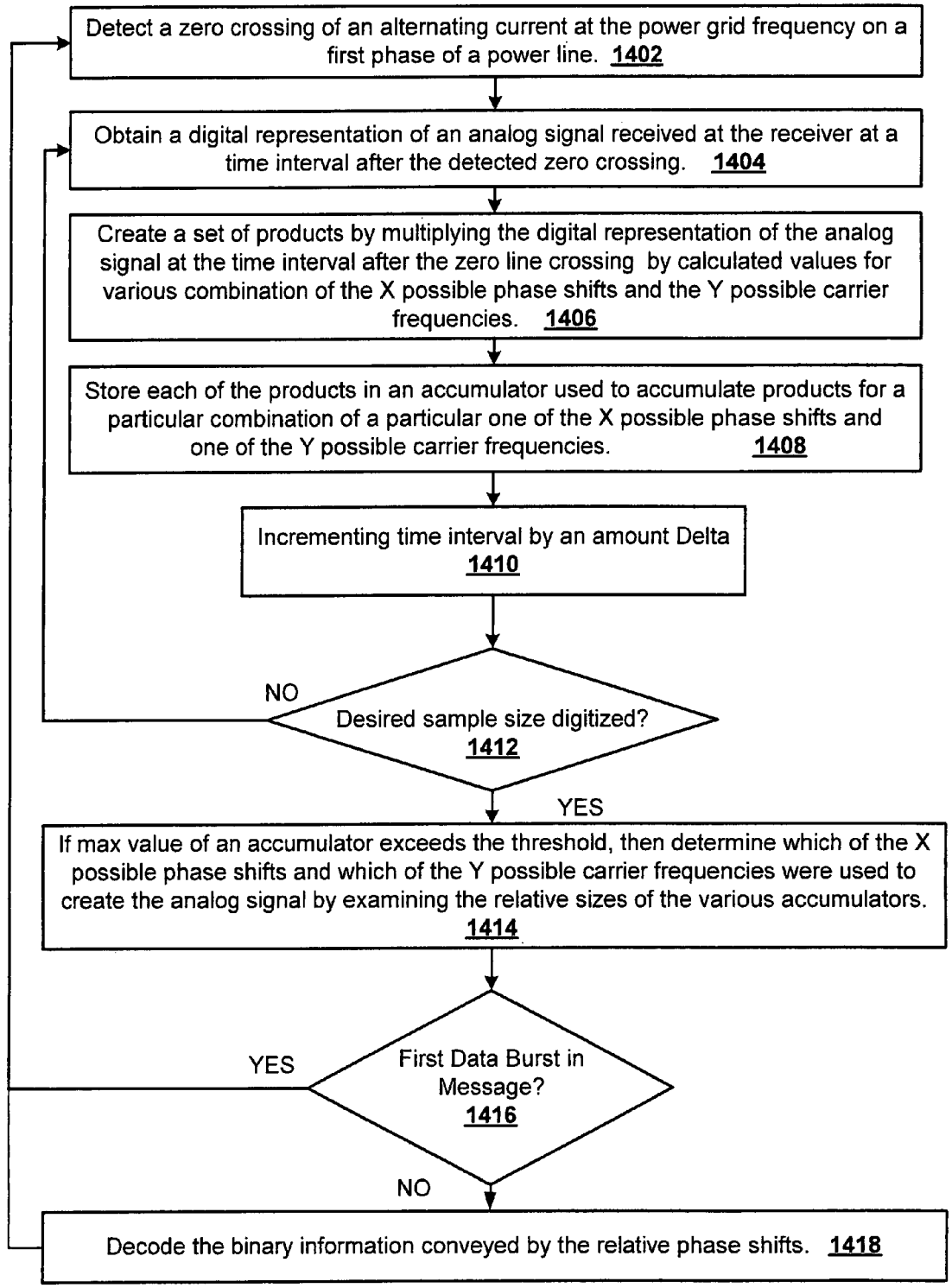
FIG. 14 is a flowchart of an example of a method for matching an incoming analog signal conveying one of X possible phase shifts on one of Y possible carrier frequencies.

FIG. 14 is a flowchart of an example of a method for matching an incoming analog signal conveying one of X possible phase shifts on one of Y possible carrier frequencies. The method in FIG. 14 also detects a zero crossing of the alternating current on a first phase of the power line as shown in step 1402. The analog signal is converted to digital samples and stored.

At step 1404, a subset of the digital samples representing the levels of the analog signal received during a time interval after the zero crossing is retrieved for analysis. The time interval may be specified as a size of an array of samples where the size multiplied by the sampling rate of the analog-to-digital conversion equals the desired time interval.

At step 1406, the digital samples in the time interval are multiplied by generated digital ideal values for the time interval. The products are generated for various combinations of X possible phase shifts and Y possible carrier frequencies.

At step 1408, the products are stored and summed in an accumulator corresponding to one of the X possible phase shifts and one of the Y possible carrier frequencies. As above the generated waves are not synchronized with the transmitter or the zero crossing so that the phase shift between the incoming analog signal and the created waves is meaningless, but the difference of phase shifts between two successive bursts of data conveys the data from the transmitter as this data is accurately decoded since the difference in phase shifts is independent from the difference between the transmitter and the created waves in the receiver.

At step 1410, the time interval is incremented by a number, delta, to obtain a next subset of samples.

At decision block 1412, the size of the samples processed is checked to determine if a desired set of samples have been processed. If not, steps 1404, 1406 and 1408 are repeated for the set of samples in the time interval designated by delta. If enough samples have been processed, control transfers to step 1414.

At step 1414, if an accumulator value exceeds the threshold then the burst is treated as having data and the maximum accumulator value may be used to determine which of the X possible phase shifts and which of the Y possible carrier frequencies were used to generate the analog signal.

At branch 1416, the process returns to step 1402 if this is the first data burst in a message as the actual data is conveyed in the relative movement of the phase shift from burst to burst. If this is not the first data burst in a message, then at 1418 the phase shifts for this burst and the previous burst are used to decode the binary information conveyed by this data burst.

Dynamic Adjustment of Acceptance Threshold

As discussed above, when using an embodiment with four accumulators (sine, cosine, negative sine and negative cosine) in a system with four possible phase shifts, the maximum positive value from the four accumulators for a given carrier frequency is compared with a threshold value to determine whether to use the information from the digitized values captured between successive zero crossings. If the maximum positive value from the four accumulators is below (or in some implementations equal to or below) the threshold value, then the values in the accumulators are not processed further.

If as is preferred, two accumulators are used (sine and cosine) then a valid burst of data could be in the form of a negative sine wave thus leading to a large value in magnitude but negative in sign as the sampled digital values will be close to mirror images of the set of values from an ideal sign wave. Multiplying these pairs and storing them will lead to a large negative value. Thus, in a two accumulator per carrier frequency implementation, the level compared to the threshold would be the magnitude of the accumulator value independent of the sign of the value (or in other words the absolute value of the accumulated value).

Rather than repeating the distinction between four accumulator and two accumulator implementations, it will be understood that the largest level of an accumulator will refer to the largest positive value for a four accumulator implementation and the largest absolute value for a two accumulator implementation.

Nature of the Problem

Figure 15:
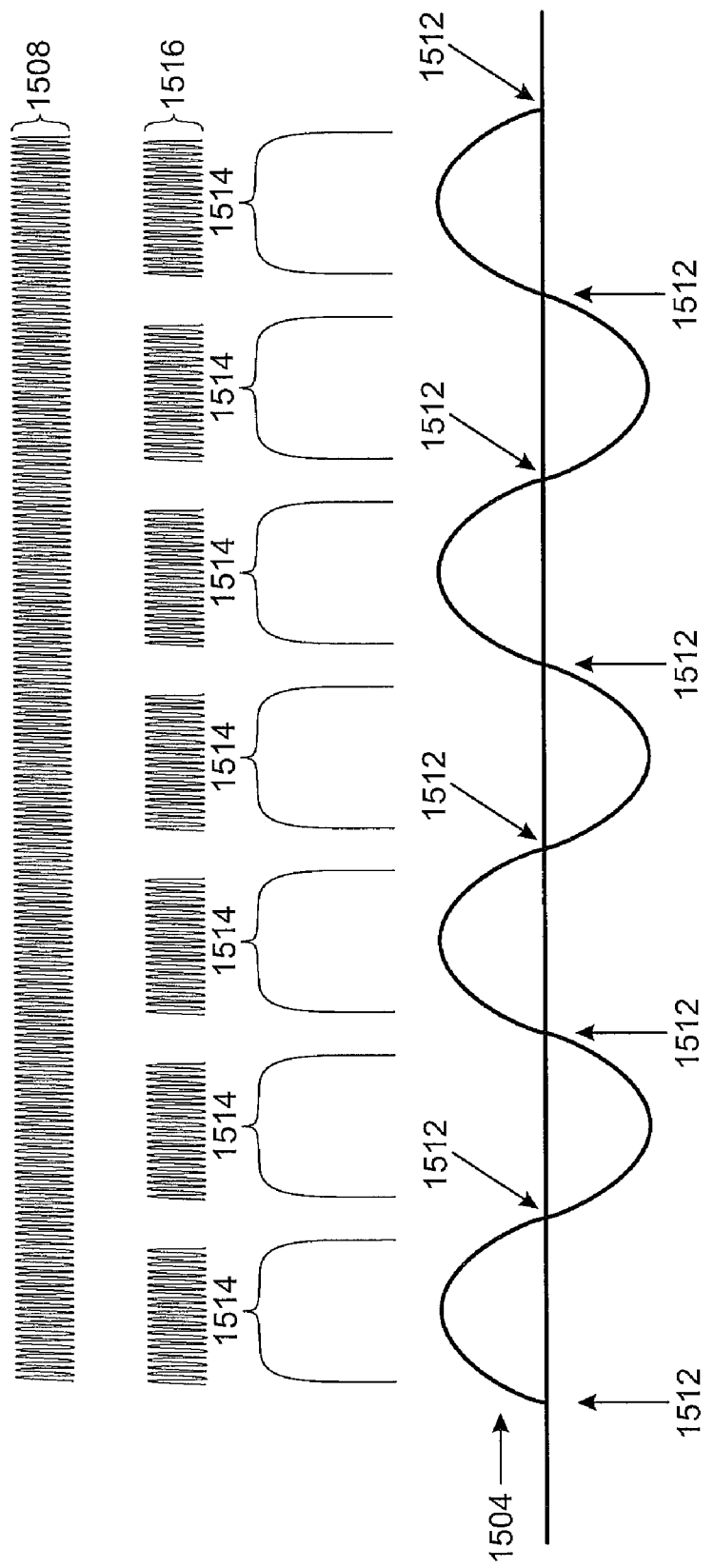
FIG. 15 shows a set of wave forms of the alternating current conveyed over the power distribution system along with bursts that will be processed and judged as having either conveyed data or just noise.

FIG. 15 shows a set of wave forms of the alternating current conveyed over the power distribution system. This may be 60 Hz, 50 Hz, or another suitable frequency. Power line transmitters may inject a series of phase shifted signals onto the power line using a carrier frequency that is much higher than the alternating current carried by the power line. For example frequencies in the order of magnitude of 50 kHz. The transmitters send out the phase shifted signal relative to the zero crossing of the alternating current on the power line. The receiver can sense the zero crossing of the alternating current and thus synchronize the multiplication of digitized samples of the signal removed from the power line carrier by a pick-up coil with certain created values representing wave form at an expected carrier frequency with a certain phase offset from the zero crossing. In a typical application, the phase shift of one burst is compared to the phase shift of the preceding burst to receive the conveyed data (two bits for a system that recognizes four different phase shifts).

As noted above, the system may be adapted to only sample a window of time within a burst between two subsequent zero crossings. While the system may sample only during a window that is placed so as not to be too close to the zero crossings of the underlying power grid frequency, the transmitter may well inject signal for the full period between zero crossings.

The sampled window may be a 6.4 msec window within a slightly less than 8.33 msec period between zero crossings for a 60 Hz alternating current power system. FIG. 15 shows an alternating current waveform 1504 with a frequency on the order of magnitude of 60 Hz and signal 1508 received from the pick-up coil. This received signal 1508 contains a combination of conveyed information and noise. The set of zero crossings 1512 of the alternating current waveform 1504 are used to select samples of bursts 1516 of the received signal 1508 by creating sample windows 1514 relative to zero crossings 1512.

As described above, the received signal is converted into a sequence of digital values and these are multiplied against a series of created values for an ideal waveform and the values stored in an accumulator. The sequence of digital values from the received signal is also multiplied against one or more other series of created values of ideal waveforms and each series of products are stored in an accumulator. One system may use two accumulators per carrier frequency (such as when the decoding is done using I and Q) and another implementation may use as many accumulators as there are possible phase shifts used to convey information (for example 4 different phase shifts).

For each burst sample 1516 (or just simply burst), the system must decide whether to continue processing the results from the accumulators and use the phase shift relative to the last data burst as indicative of conveyed material or to discard the burst as noise as there is not a sufficient level of confidence that the burst contained data instead of just noise. While a system could be implemented that sets this threshold during installation and perhaps allows for a technician to alter the threshold as either too high a percentage of bursts are being discarded or too many bursts that seem to have noise are being handled as carrying data, there are advantages to having a receiver adjust the threshold over time to adjust to system conditions.

In a power line carrier system the background noise fluctuates significantly, caused by power equipment turning on and off and a multitude of competing communications circuits. The time varying nature of the background noise suggests that the threshold level should adapt itself with the varying background noise in order to optimize the reception quality. A fixed threshold level would generally lead to suboptimum reception quality. When the background noise is low, the fixed threshold would likely be higher than necessary and a weak signal would unnecessarily be missed. When the background noise is high, the fixed threshold would likely be lower than desirable and the resulting reception would be based on noise and lead to bit errors.

Consequences of an Error.

In many engineering problems there are two types of error and one error is much more problematic than the other so the system is biased to make the low consequence error more often than the high consequence error. In this case the problems caused by mistakenly treating a burst with conveyed data as noise is much more of a problem than occasionally mistaking a burst with just noise as having data.

Discarding One Burst of Real Data Loses an Entire Message

As each burst is sending only 2 bits of a longer message, for a typical message that is 98 bits long, it takes 50 bursts to convey a message. The first burst to provide a reference phase shift between the transmitter and the ideal waveforms in the receiver and each subsequent burst conveying 2 bits of data in the relative phase shift between that burst and the previous burst (assuming a system with four recognized phase shifts). If one burst of real data is discarded the message will not be fully received and will be discarded as there is not bidirectional communication between the transmitter and the receiver so there is not an acknowledge message sent back from the receiver to the transmitter or a resend message to ask for an immediate resend. The entire 50 burst message will be lost and not replaced until the next regularly scheduled transmission from that transmitter.

As this system is used to relay status information, losing some messages is a tolerable condition as the transmitters are sending new messages relatively frequently relative to significant changes in transformer status (for example a transmitter may be set to send a new message once every 60 to 240 seconds). There are often specialized event recorders that capture rapid sequences of events related to a transformer. The power line carrier system is used to convey status information from many transformers to a more centralized receiver.

While it may be tolerable to lose some messages from transmitters, it is desirable to be able to receive intact messages which requires the ability to receive approximately 50 bursts in a row without discarding data under the false assumption that the burst contains just noise rather than data. One way of decreasing the risk of ruining a 50 burst message by throwing out one or more bursts as just noise is to set the minimum threshold at or just above the ambient noise level so that a weak signal is treated as a signal rather than discarded as just noise.

Accepting a Burst of Just Noise as Data is Harmless

If the burst with just noise is mistakenly taken as a data burst is during a quiescent period, when in reality no transmitter is conveying data to this channel on the receiver, this error is harmless. Just as the system will discard a 50 burst message when it mistakenly believes that one of the 50 bursts is noise as it needs to have 50 consecutive bursts of data, the system will disregard any bursts with just noise that are accidentally deemed data unless the system deems 50 bursts in a row of just noise to be data. Even then, fifty bursts of noise are unlikely to be processed as legitimate data as it is unlikely that the noise would be able to pass the parity check if the system uses a parity check to help ensure data integrity.

A Method for Dynamic Adjustment

One method for dynamically adjusting the threshold value used to determine whether the discard a data burst is disclosed below. A brief overview will provide the big picture and then a more detailed discussion can be done within the context of the big picture.

A) Collect the maximum level found in any accumulator over a series of bursts. For example, a set of 50 bursts (25 alternating current cycles). This group of bursts can be called a batch. While it is not essential that the batch size be the same size as the messages, it may be useful to size the batch size to be the same magnitude as the message size so that you adjust the system to reliably not discard data as just noise for a sequence that is approximately the size of a data message. Thus if the typical data message was 406 bits (204 bursts) then the designer may use a batch size of approximately 200 bursts rather than 50 bursts. Thus, the ratio of bursts in a batch to bursts in a data message may be in the range of 0.5 to 2 but preferably closer to 1.

B) Compare the maximum level for a batch against the current level used for the threshold. One method of handling magnitudes and levels is to set the level as the most significant bit with a value in it. Thus for the number 0000 0001 1010 1001, this is a positive number as the left most bit is a zero. The most significant bit with a non-zero value is bit 9 for $2^8$ as that is the leftmost bit with a 1 in it. A system could refer to this bit as bit 9 or as $8^{th}$ power as it is the bit for $2^8$ values. To avoid repeating the variations in ways of referring to this bit, we can call it the level 9 bit. Thus, this value would exceed a threshold if the threshold was set to 8. Note that using the levels in this way provides a logarithmic scale that ranges from 1 to 15.

For a negative value expressed in two's compliment convention, the same absolute value would be expressed as 1111 1110 0101 0110 with the leading 1 indicating that this is a negative value and the most significant bit with a two's compliment zero in it is the $9^{th}$ bit but $8^{th}$ power as above. Again we can adopt a convention and call this a level 9 as the $9^{th}$ bit is the most significant non-zero bit (as ones become a zero in two's compliment notation). Thus if the current threshold was 8, this absolute value would exceed the threshold.

In either case, the level can be determined by decrementing from 15 each time the bits in the magnitude are shifted to the left before the first bit (sign) does not equal the most significant bit of the shifted magnitude. In both of the examples above, the magnitude would be shifted 6 times until the sign bit did not equal the adjacent bit. 15−6=9.

C) Repeat this process for a set of batches and note whether for that set of batches (called a block) that the net result it that there are more maximum values for batches that are above the threshold range or more maximum values for batches that are below the threshold range.

If the net count of batches above-batches below exceeds a set level, then the energy level in the incoming signal may have an increased level of noise in it and there is a risk that leaving the threshold where it is may result in an increase in the number of bursts with just background noise being treated as valid data. Thus the threshold level needs to be moved up and the process started again.

If the net count of batches below-batches above exceeds a set level, then the energy level in the incoming signal may have dropped or the level of background noise may have dropped. Since the presence of an elevated level of background noise will boost the levels in the accumulators and thus ultimately cause this dynamic system to adjust upward the threshold level, it is necessary to move the threshold level back down when the energy from background noise drops in order to reduce the number of bursts with actual data that are rejected as just background noise. Thus the threshold level needs to be moved down and the process started again.

If the ratio of more batches above compared to more batches below is close to even, then the threshold does not need to be adjusted but the process can start again in order to see whether the next block of N batches of bursts indicates a need to adjust the threshold.

FIG. 16 shows a data chart for a series of 50 bursts (a batch). The maximum level for the accumulators for each burst is recorded and compared against the current level being used to accept data as valid which is 10. An inspection of FIG. 16 shows that this batch of 50 bursts has all accumulator magnitudes less than the current acceptable threshold of 10. In other words, all of the bursts received during this batch were discarded. Presumably as this batch of 50 bursts did not contain any valid data.

Note that all it takes is one elevated accumulator magnitude to count a batch as having an above level value but it take 100% of the 50 bursts to be below the current threshold value in order to count as a batch with a maximum value below the current threshold level.

To ensure that the threshold level is only changed in response to a real change in operating conditions, a series of batches are examined in a block. If the net result is that there is a definite trend of many more batches with a maximum on one side of the than batches with a maximum accumulator value on the other side of the current threshold level, then and only then is the threshold level changed.

In order to appreciate the expected values of batches with maximum values above and below the threshold value, it is useful to discuss the expected frequency of batches with maximum values above the threshold level. If the threshold level is set appropriately, this should be just the batches that contain at least some bursts with actual data.

Frequency of Data Transmission

Assume for this example that if a receiver was set to have one channel receiving input from 60 transmitters (fifteen transmitters on each of four carrier frequencies) and the average time between transmissions for each transmitters was 120 seconds each. (As an aside, in order to have the transmission times wander for one transmitters with respect to other transmitters, transmitters with a nominal transmission gap of XXX seconds between transmission would have a small offset of YYY milliseconds added. The YYY offset being a unique number for that channel so that the transmitters cannot remain aligned in transmission time). If there are on average 60 transmissions in 120 seconds, that would be on average 1 transmissions every 2 seconds. A two second period for a power line frequency of 60 Hz is 240 half cycles or 240 bursts.

As the length of a data transmission is 50 bursts, in a period of 6 batches of 50 bursts one would expect on average a full data message of 50 bursts and part of another message. As most of the time, a data message of 50 bursts will not align perfectly with a 50 burst sample used in a batch, one would expect that in a period of 6 batches to see three batches with real data and thus elevated accumulator values. If the other three batches had only background noise and the threshold level was set above the upper range of background noise then all three of the other batches would fail to have any accumulator store a value equal to the threshold. Thus, the tally for the 6 batches would be three above and three below for a net of zero. If due to the wander of transmission times for the transmitters and the general lack of coordination between transmitters, there were 4 batches with values above the threshold (presumably each batch with at least some data) and two with just background noise that would be a net of 2. If there were only two batches with data and the other four had background noise that did not cause an accumulator to reach the threshold level, then that would be a net of −2.

In many instances, the maximum accumulator value during a batch of 50 bursts without noise will equal the threshold value. This entire batch will be discarded as only bursts with at least one accumulator value in excess of the threshold value are processed.

The situation might be slightly more random with an occasional burst of noise with sufficient energy to cause a maximum value for a batch to exceed the threshold level. However, in most instances when the data is being received in the normal frequency and the threshold level is appropriately set, the net for batches with maximum accumulator values exceeding the threshold level and batches with a maximum level below the threshold level should be close to zero. The instances where the net is significantly different from zero in a block of only six batches are likely to indicate a need to adjust the level.

Table C provides a chart with the various possibilities for net of batches with max value above the threshold—number of batches with maximum value below the threshold for a block of six batches. In any instance in the chart where the sum of batches with maximum value above and maximum value below is less than six, the reminder of batches had a maximum value equal to the threshold.

TABLE C

| Number of batches with Max Value Above Threshold | | | | | | | |
|---|---|---|---|---|---|---|---|
| Six | 6 GO↓ | | | | | | |
| Five | 5 GO↓ | 4 GO↓ | | | | | |
| Four | 4 GO↓ | 3 | 2 | | | | |
| Three | 3 | 2 | 1 | 0 | | | |
| Two | 2 | 1 | 0 | −1 | −2 | | |
| One | 1 | 0 | −1 | −2 | −3 GO↑ | −4 GO↑ | |
| Zero | 0 | −1 | −2 | −3 GO↑ | −4 GO↑ | −5 GO↑ | −6 GO↑ |
| | Zero | One | Two | Three | Four | Five | Six |
| | Number of batches with Max Value Below Threshold | | | | | | |

During the start-up sequence for the receiver, the threshold value is initialized. For example, the initial threshold value may be initialized to 8 on a 1 to 15 scale. (step not shown)

Flowchart of One Implementation

Figure 17:
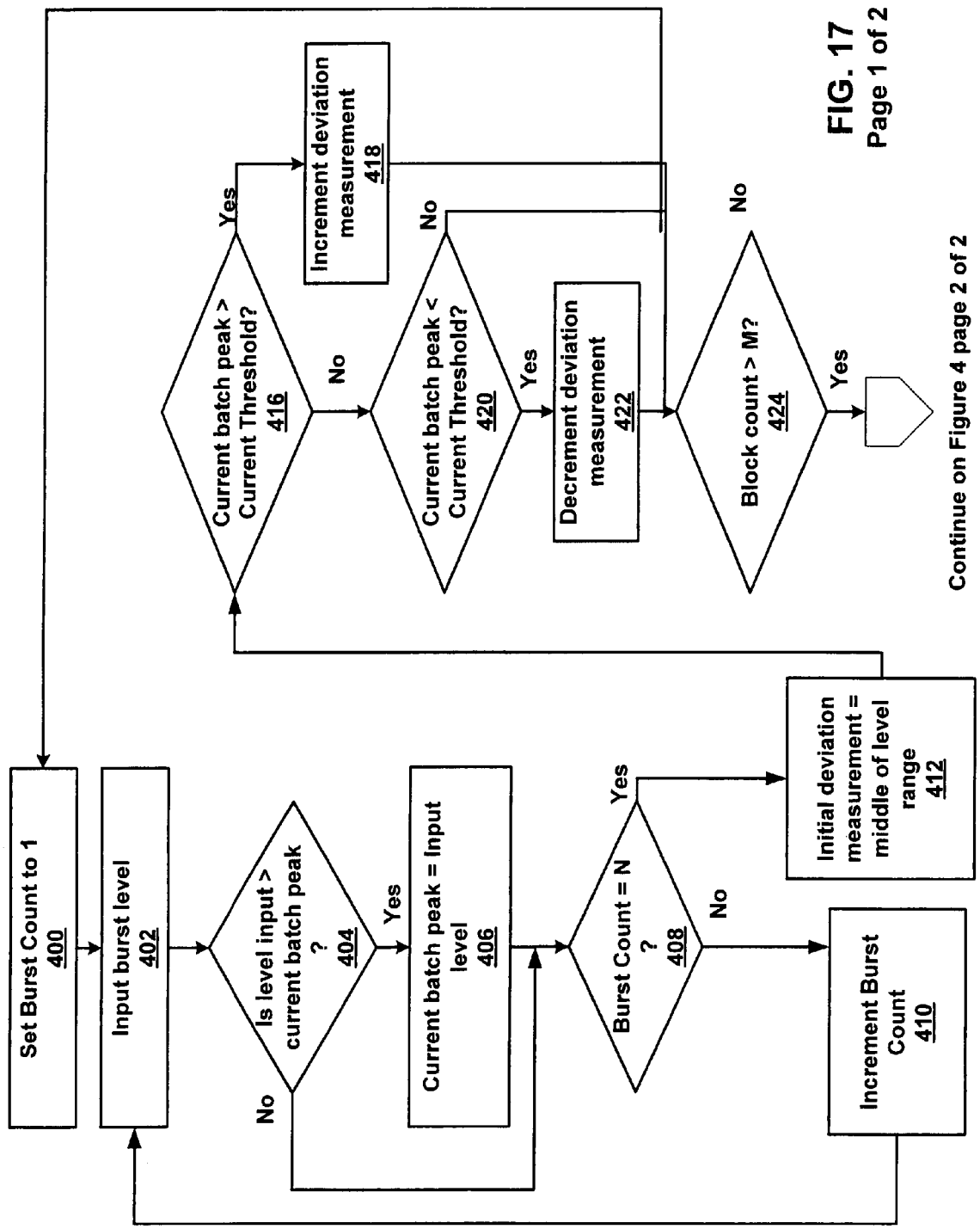
FIG. 17 provides a flow chart to illustrate the logical steps for one implementation of teachings of the present disclosure.
Figure 17:
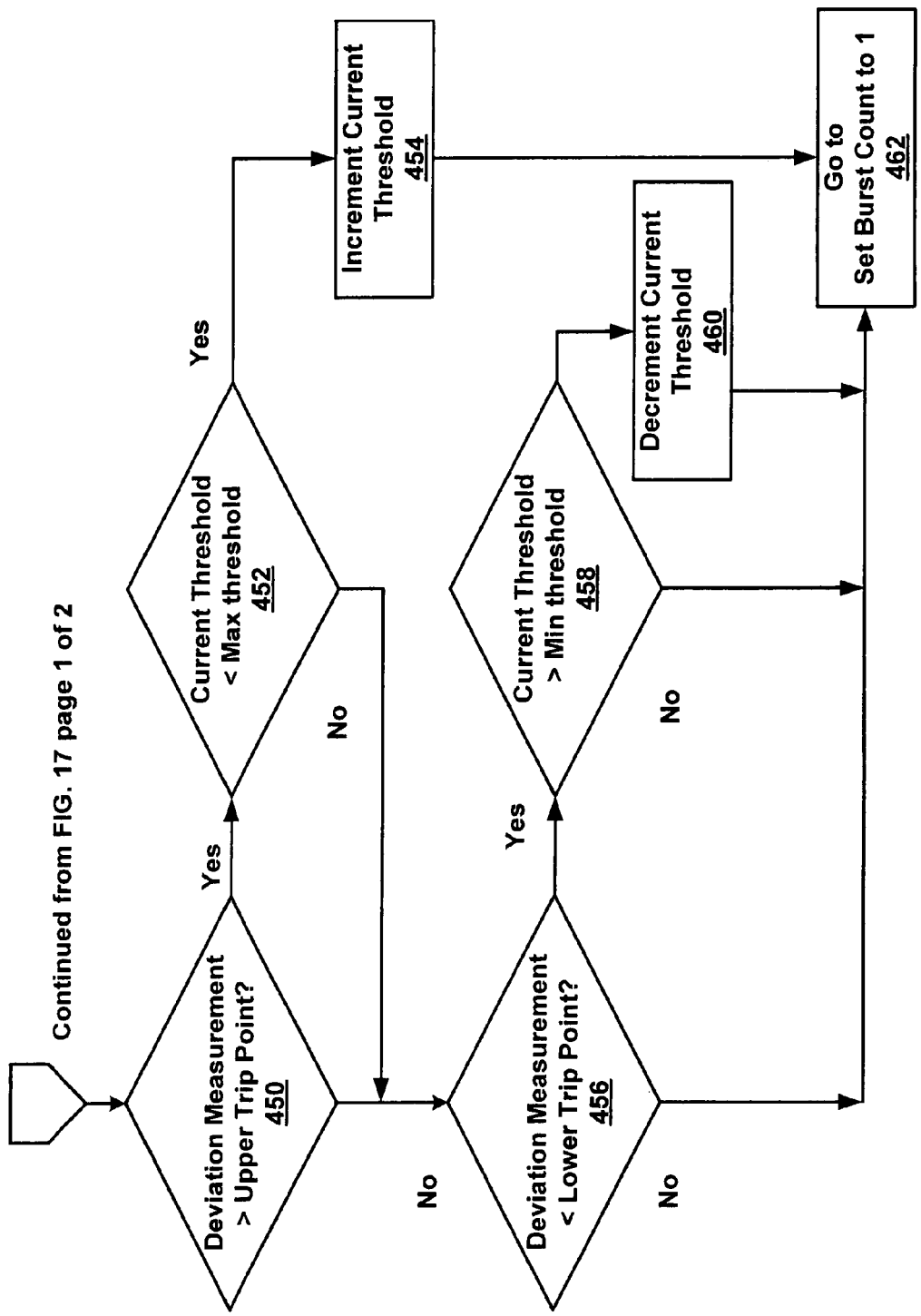

FIG. 17 provides a flow chart to illustrate the logical steps for one implementation of teachings of the present disclosure. One of skill in the art will recognize that the concepts expressed in this flow chart may actually be implemented slightly differently given the nuances of a particular programming language while achieving the same result. One of skill in the art will recognize that logic that calls for action when a parameter is at least X can be implemented by a trigger that test whether the parameter is greater than X−1.

400—The burst count is set to 1 so that the number of bursts processed can be counted.

402—In the method shown in FIG. 17, a burst level is input at step 402. The burst level may be any value indicative of an amount of energy received in a frequency band of a carrier signal that is being decoded for the information it was coded with by the transmitter. As described above it is the maximum level found in the accumulators. Step 402 is performed N times to collect a batch of N bursts. A burst count may be kept to keep track of the number of bursts processed.

404—In decision block 404, the input burst level is compared with a current batch peak. The current batch peak may be a value stored in a register or a memory location that contains the highest absolute value of all the burst levels input.

406—As each burst level in input, the current batch peak is updated if the new burst level is greater than the current batch peak as shown in step 406. If the burst level is not greater than the current batch peak, the current batch peak is left unchanged.

408—At decision block 408, the burst count is checked to determine if N bursts have been checked. If the burst count is indicates that the batch is complete N (N=50, for example), the method proceeds to processing a batch of bursts starting at step 412.

410—If the burst count does not indicate a completed batch, then the burst count is incremented.

412—The processing of a batch of bursts includes step 412 in which the initial deviation measurement is set to the middle of a range of possible outcomes. As the method seeks the net difference between the number of batches with maximum values above the current threshold and the number of batches with maximum values below the threshold value, this net value needs to be counted. For computational simplicity it may be convenient to move the center from a net of zero to a number large enough that it can move 6 in either direction and stay positive. In one implementation the initial deviation number may be set to 8 and than incremented and decremented from there. Thus the thresholds for change would need to be set relative to the starting point of 8.

416—At decision block 416, the current batch peak is checked against the current threshold. The current threshold is the threshold currently being used by the communications system to determine whether a level represents signal (information-bearing signal) or just noise.

418—If the current batch peak is greater than the current threshold, the deviation measurement is increased. In the example illustrated, the deviation measurement is increased by incrementing by one. The increase to the deviation measurement may be a different amount in a specific implementation.

420—If the current batch peak is not greater than the current threshold, the current batch peak is checked to determine if it is less than the current threshold at decision block 420.

422—If the current batch peak is indeed less than the current threshold, the deviation measurement is decreased as shown at step 422. In the example illustrated, the deviation measurement is decreased by decrementing by one. The decrease to the deviation measurement may be a different amount in a specific implementation.

424—At decision block 424, a block count is checked to determine if M blocks have been processed. If M blocks have not been processed, the method returns to step 400 to reset the burst count to 1 and repeat the process for another batch of bursts.

450—If M blocks have been processed, the deviation measurement is compared with an upper trip point at decision block 450.

The upper trip point may be a value indicative of an increase in the deviation measurement that would be sufficient to warrant an increase to the threshold value as too many batches have peak values above the threshold value indicating that background noise is at least periodically causing accumulator results that exceed the threshold value so that background noise is being processed as data. As noted above, it is likely that the burst with noise will be discarded ultimately as it is unlikely that a string of 50 bursts of noise would have enough energy to exceed the threshold.

452—As the current threshold cannot be incremented if it is already at the maximum value, this is tested at branch 452 (or alternatively added with a Boolean AND to the branch at 450).

454—If both tests are satisfied, the current threshold level is increased.

456—If the deviation measurement is not greater than the upper trip point, then at decision block 456, the deviation measurement is checked to determine if it is less than the lower trip point.

458—If the deviation measurement is less than the lower trip point, the current threshold is tested to see if it is above the minimum possible threshold at branch 458.

460—If the deviation measurement is less than the lower trip point, and the current threshold is above the minimum possible threshold, then the current threshold is decreased at step 460.

462—Whether the threshold is increased, decreased, or left as is, at the end of processing the block of batches, the process starts again by Go To 462 which connects to step 402 to reset the burst count to I and begins the work with another batch of bursts.

Block Diagram of Signal Threshold Adjuster

Figure 18:
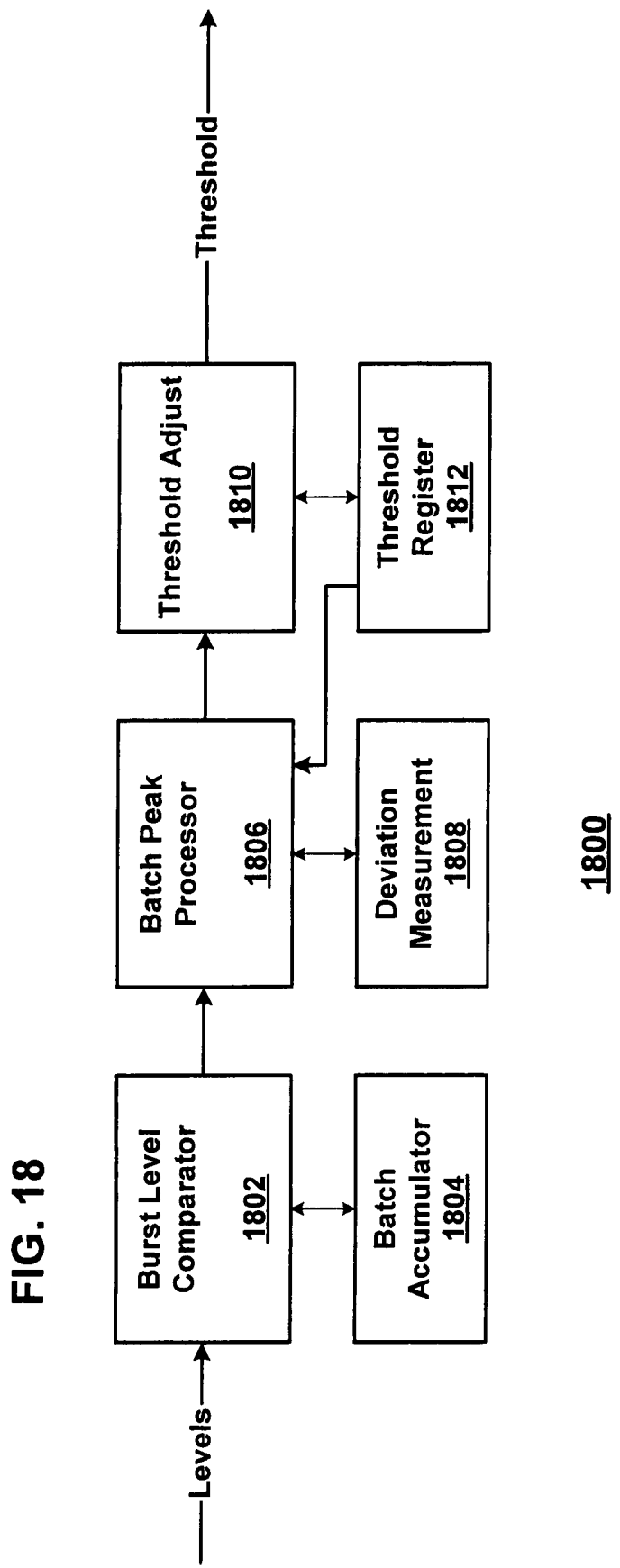
FIG. 18 is a block diagram of an example of a signal threshold adjuster

FIG. 18 is a block diagram of an example of a signal threshold adjuster 1800 that implements the logic shown above in FIG. 17. The signal threshold adjuster 1800 in FIG. 18 includes: a burst level comparator 1802, a batch accumulator 1804, a batch peak processor 1806, deviation measurement register 1808, a threshold adjustment function 1810, and a threshold register 1812. The signal threshold adjuster 1800 inputs levels from the Multiplier Accumulator (shown as 730 in FIG. 7). The levels may be conveyed as four bit numbers denoting one of fifteen categories of energy levels as we are using the most significant non-zero bit of the 15 bits of the magnitude portion of the accumulator for the levels.

The accumulators in the Multiplier Accumulator as described above contain 16-bit values (with one bit of the 16 for sign). The levels input to the signal threshold adjuster 1800 may be the most significant non-zero bit of the magnitude of the accumulator having the largest value out of the two accumulators in the MAC 730. (as noted above in some implementations this is the largest absolute value and in some implementations this is the largest positive value).

The burst level comparator 1802 receives the levels from the Multiplier Accumulator at each burst time period. The burst level comparator 1802 evaluates N consecutive bursts and stores the greatest level encountered in the batch accumulator 1804 as each burst is processed. In one example, the number N of bursts evaluated is 50. The N consecutive bursts are called a batch as noted above. At the end of each batch, the burst level comparator 1802 passes the contents of the batch accumulator 1804 to the batch peak processor 1806.

The batch peak processor 1806 receives an updated value of the contents of the batch accumulator 1804 from the burst level comparator 1802 after the completion of each batch. The batch peak processor 1806 also inputs the present threshold value from the threshold register 1812. In one example, the batch peak processor 1806 stores a running count of the number of batches having at least one maximum value that is higher than the present threshold minus the number of batches having a maximum value less than the present threshold.

This running count of net batches above-batches below is maintained in the deviation measurement register 1808. The running count is increased for values higher than the threshold register 1812, and decreased for values lower than the threshold register 1812. If the maximum value for a batch is equal to the threshold value (meaning the most significant bit) then the running count is not modified.

The batch peak processor 1806 keeps the running count for M consecutive batches. In the example described above, M is 6 batches. The M consecutive batches are called a block. After each completed block, the running count which was stored as the value in the deviation measurement register 1808 is passed to the threshold adjustment function 1810.

The threshold adjustment function 1810 uses the deviation measurement value (the running count) to update the active threshold level (if necessary). The threshold adjustment function 1810 may compare the deviation measurement (the net value captured in the running count) with deviation values that would indicate a need to change the current threshold value. In one example, the threshold adjustment function 1810 compares the deviation measurement register 1808 with an upper and lower trip point to determine how the threshold is to be adjusted, if at all. For example: if the deviation measurement register 1808 yielded a value greater than the upper trip point, the value in the threshold register 1812 is stepped up. If the deviation measurement register 1808 yielded a value smaller than the lower trip point, the value in the threshold register 1812 is stepped down.

In one example, the trip points may be determined as follows: A) Number of counts up−Number of counts down >Upper Trip Point=3 and B) Number of counts down−Number of counts up >Lower Trip Point=2. Requiring more than 3 as the upper trip point means requiring a net of 4 to 6 on a −6 to 6 scale or more than 11 on a 0 to 15 scale (with a net of zero mapped to eight). Requiring more than 2 for the lower trip point means requiring a net of −3 to −6 on a −6 to 6 scale or less than 6 on a 0 to 15 scale (with a net of zero mapped to 8).

The trip points shown above are used for an example in which the levels are four bit values representing the most significant bit of the magnitude of an accumulator and the threshold is stored as a four bit value in the threshold register 1812.

One of skill in the art will recognize that the specific values of the trip points, N and M, as well as the number of bits used for containing the levels and the threshold value, and the form of scaling the levels may all be varied in specific implementations to account for desired performance and usage of processor and memory resources.

Schematic

Figure 19:
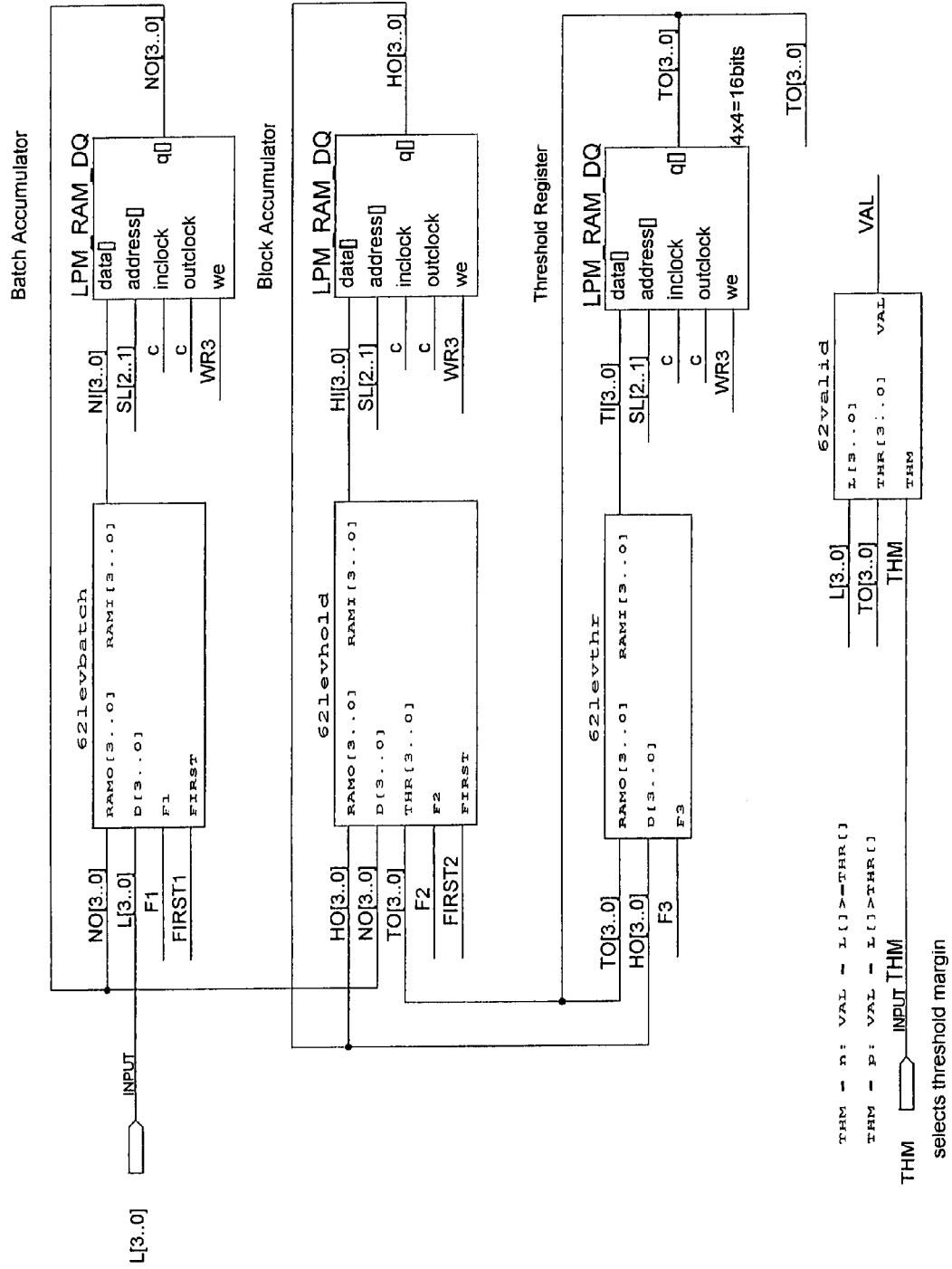
FIG. 19 is a schematic of one implementation of the signal threshold adjustment.

FIG. 19 is a schematic diagram of an implementation of a threshold adjustment system described above.

The variables referenced on this diagram are as follows

| Variable | Purpose |
| --- | --- |
| L[3 0] | Level of measured burst is input to threshold adjuster |
| NO[3, 0] (data) | Value of greatest level in burst |
| F1 | Timing signal |
| First1 | Timing signal |
| NI[3, 0] | Input to NO[3, 0] ram |
| SL[2 . . . 1] (address) | Timing signal |
| C (inclock) | System clock |
| C (outclock) | System clock |
| WR3 (we) | Timing signal |
| HO [3 . . . 0] | Average deviation from present threshold |
| TO [3 . . . 0] | Threshold in effect |
| F2 | Timing signal |
| First2 | Timing signal |
| HI[3 . . . 0] | Input to HO[3, 0] ram |
| F3 | Timing signal |
| TI[3 . . . 0] | Input to TO[3, 0] ram |
| THM | Selects threshold margin |
| VAL | Valid when signal level is above current threshold |
| THR [4 . . . 0] | VAL and TO[3.0] to next module |

The functions and memory designations illustrated in FIG. 19 are shown as source code for implementing the functions in FIGS. 20A and 20B which are written in Altera Hardware Description Language ("AHDL") one of the languages that may be used to convey logic to an Altera programmable device. F series variables are timing signals.

The THM parameter is not central to the present disclosure. The use of the THM parameter provides a way to change the range of valid accumulator magnitudes relative to the threshold. For example, the THM parameter could be used to change the operation from requiring the most significant bit in the accumulator magnitude to exceed the current threshold to making it valid when it was equal to the threshold or exceeded it. Alternatively, the THM parameter could be used to switch from requiring the most significant bit in the accumulator magnitude to merely exceed the current threshold value to requiring that it be at least the current threshold value plus two.

Another Implementation of Dynamic Threshold

There are many different algorithms which can be used to perform the threshold adaptation. Dependent on the message length, the message frequency and message amplitude, one or the other algorithm may be more or less effective. An alternate algorithm that may be used is as follows:

As above, the multiplier accumulation would accumulate the sums of digitized samples of the bursts multiplied by values of ideal waveforms. The maximum value of the accumulation would be taken as representative of the energy level of the burst. The magnitude of the accumulator would have a most significant bit in one of 15 magnitude bits, thus allowing the burst energy to be categorized by 1 to 15, represented by a four bit number (L[3 . . . 0]). The representation is in a logarithmic scale. A higher resolution could be used that uses more than 15 bits for the magnitude. However, this would use up more FPGA resources for a small improvement in performance.

The maximum level encountered in set of bursts (for example 50 consecutive bursts) is determined and outputted as the maximum value for the batch of bursts.

For a set of batches (say 16 batches), the minimum value of 16 batches could be determined. This would be the minimum for the block of 16 batches with the value for each batch being the maximum for each set of 50 bursts in a batch.

This minimum value would represent the upper end of the energy range for noise during a batch of 50 bursts that presumably did not have any data. (Given the frequency of transmissions described above, it would not be likely that all 16 batches would have at least some valid data bursts.) As an estimate of the upper range of the energy of the background noise under current conditions, the value would be useful for setting a threshold to distinguish a burst with a weak data signal from a burst with only noise.

After each completed block the resultant value, i.e. the lowest level batch in the block, is compared with the present threshold value. If the measured value is greater than the present threshold an up command is generated. If the measured value is smaller than the present threshold a down command is generated. If the measured value is the same as the present threshold, a do nothing command is generated.

The levthr function uses its input commands to update the active threshold level.

If the input command is up, the new threshold level will be stepped up. If the input command is down, the new threshold level will be stepped down. If the input command is do nothing, the new threshold level will remain unchanged. The threshold level is used in the phase processor to decide whether the received burst meets the signal threshold for acceptance. For example, any burst that did not have enough energy accumulated in the energy accumulator to have a most significant bit that exceeds the current threshold level would be deemed to contain only noise.

Alternative Embodiments

The example provided above relied upon a means for synchronizing the actions on the transmitter and receiver so that the receiver sampled the burst between zero crossings as the transmitter would change what was being transmitted at zero crossings. The particular means used was to detect the zero line crossing of the power line signal (such as 50 or 60 Hz). Those of skill in the art will recognize that other means for providing synchronized operation of the transmitter and receiver can be used such as synchronizing the clocks in the transmitter and receiver. Synchronizing clocks for a number of transmitters with a receiver is more work than synchronizing a single transmitter with the receiver but still possible.

Another way to provide coordination of the receiver and the transmitter in order to implement the present method is to transmit an extended pattern (no signal, alternating signal, et cetera) and then indicate the start or imminent start of a transmission burst by ending the extended pattern.

The implementations described above for a four accumulator implementation that uses the largest positive value to identify which of four possible phase shifts were used for a given burst of data could be implemented by one of skill in the art with some other number of accumulators such as 8 or 16 if more possible phase shifts are used to convey three or more bits of information per data burst rather than two bits.

The various teachings of the present disclosure may, however, be embodied in many different forms and should not be construed as limited to the embodiments set forth herein; rather, these embodiments are provided so that this disclosure will be thorough and complete, and will fully convey the scope of the inventive concepts to those skilled in the art. Like numbers refer to like elements throughout.

Those skilled in the art will recognize that the methods and apparatus of the present disclosure have many applications and that the present disclosure is not limited to the specific examples given to promote understanding of the various teachings of the present disclosure. Moreover, the scope of the present disclosure covers the range of variations, modifications, and substitutes for the system components described herein, as would be known to those of skill in the art.

The legal limitations of the scope of the claimed material are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of decoding a phase shift keying signal carried on a carrier frequency over a power line operating at a power grid frequency, the method comprising the steps of:
    using a zero crossing detector to detect a zero crossing of the alternating current on a first phase of the power line operated at the power grid frequency;
    using a receiver to receive a burst of received analog signal carried on a carrier frequency over a power line;
    converting at least a portion of the burst of received analog signal carried on the carrier frequency to a set of digital samples, the portion corresponding to the analog signal during a burst sampling window between zero crossings established in relation to the detected zero crossing on the first phase of the power line;
    creating a set of digital values of an ideal cosine wave with a frequency substantially equal to the carrier frequency;
    creating a set of digital values of an ideal sine wave with frequency substantially equal to the carrier frequency;
    multiplying a subset of digital samples from the burst with a subset of corresponding created digital values for the ideal cosine wave and storing the sum of the products as the In-Phase Component of the set of digital samples;
    multiplying the subset of digital samples from the burst with a subset of corresponding created digital values for the ideal sine wave and storing the sum of the products as the Quadrature component of the set of digital samples;
    discarding the In-Phase component and the Quadrature component if an energy level in the received analog signal does not exceed a threshold value;
    when the energy level in the received analog signal exceeds a threshold value, obtaining a phase offset for the received analog signal from an ideal cosine wave by obtaining the Arctangent of the quotient of the Quadrature component divided by the In-Phase component;
    using pairs of obtained phase offsets from adjacent bursts to decode the binary information conveyed by phase shift keying in the received analog signal; and
    dynamically adjusting the threshold value based on measurements of the energy level in the received analog signal.

2. The method of claim 1 wherein the energy level in the received analog signal compared to the threshold value is based upon a maximum absolute value of either the In-Phase Component or the Quadrature Component.

3. The method of claim 2 wherein the energy level is the most significant bit of the maximum absolute value of either the In-Phase Component or the Quadrature Component.

4. The method of claim 1 wherein the dynamic adjustment of the threshold value based on the energy level in the received analog signal captures the maximum energy level is a series of bursts in a batch.

5. The method of claim 4 wherein the number of bursts in the series is close to the number of bursts in the average message.

6. The method of claim 4 wherein the number of bursts in the series is in the range of half to double the number of bursts in the average message.

7. The method of claim 4 wherein a series of energy levels for the maximum energy level in a series of bursts are evaluated as a block to see a net value on a comparison of the number of batches with a maximum energy level in excess of the current threshold versus batches with a maximum energy level below the current threshold and the net value is compared with set points to determine if the threshold should be adjusted.

* * * * *